(12) United States Patent  
Milne et al.

(10) Patent No.: US 12,384,469 B2
(45) Date of Patent: *Aug. 12, 2025

(54) METHOD OF MAKING A LAMINATE, AN ENERGY ABSORBING DEVICE, AN ENERGY ABSORBING DEVICE COMPOSITION, AND A FORMING TOOL

(71) Applicant: SABIC Global Technologies B.V., Bergen op Zoom (NL)

(72) Inventors: Craig Lawrence Milne, Houston, TX (US); Gregory E. Tremblay, Houston, TX (US); Dhanendra Kumar Nagwanshi, Farmington Hills, MI (US); Somasekhar Bobba Venkat, Karnataka (IN); Arunachala Parameshwara, Karnataka (IN); Matthew D. Marks, Waterford, MI (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 127 days.

This patent is subject to a terminal disclaimer.

(21) Appl. No.: 18/163,032

(22) Filed: Feb. 1, 2023

(65) Prior Publication Data

US 2023/0192197 A1 Jun. 22, 2023

Related U.S. Application Data

(62) Division of application No. 15/319,571, filed as application No. PCT/IB2015/054518 on Jun. 15, 2015, now Pat. No. 11,603,142.

(Continued)

(30) Foreign Application Priority Data

Jun. 16, 2014 (IN) .......................... 1618/DEL/2014

(51) Int. Cl.
*B29C 45/14* (2006.01)
*B29C 70/46* (2006.01)
(Continued)

(52) U.S. Cl.
CPC ...... *B62D 29/043* (2013.01); *B29C 45/14786* (2013.01); *B29C 45/14811* (2013.01);
(Continued)

(58) Field of Classification Search
CPC ........... B32B 5/12; B29C 70/22; B29C 70/08; B29C 70/50; B29C 51/02
See application file for complete search history.

(56) References Cited

U.S. PATENT DOCUMENTS 2,882,564 A 4/1959 Couse et al.
3,162,745 A 12/1964 Rohr
(Continued)

FOREIGN PATENT DOCUMENTS

CA 2361761 A1 10/2000
CA 2394790 A1 5/2001
(Continued)

OTHER PUBLICATIONS

Extended European Search Report issued in Application No. EP 19155120.9 on Sep. 20, 2019, 55 pages.
(Continued)

*Primary Examiner* — Scott W Dodds
(74) *Attorney, Agent, or Firm* — CANTOR COLBURN LLP

(57) ABSTRACT

In an embodiment, an energy-absorbing device can comprise: a polymer reinforcement structure, wherein the polymer reinforcement structure comprises a polymer matrix and chopped fibers; and a shell comprising 2 walls extending from a back and forming a shell channel, wherein the shell comprises continuous fibers and a resin matrix; wherein the (Continued)

polymer reinforcement structure is located in the shell channel.

23 Claims, 9 Drawing Sheets

Related U.S. Application Data

(60) Provisional application No. 62/012,515, filed on Jun. 16, 2014, provisional application No. 62/012,522, filed on Jun. 16, 2014.

(51) Int. Cl.
| | |
|---|---|
| *B29C 70/50* | (2006.01) |
| *B32B 3/04* | (2006.01) |
| *B32B 3/12* | (2006.01) |
| *B32B 3/28* | (2006.01) |
| *B32B 5/02* | (2006.01) |
| *B32B 27/08* | (2006.01) |
| *B32B 37/06* | (2006.01) |
| *B32B 37/10* | (2006.01) |
| *B32B 38/18* | (2006.01) |
| *B60R 21/04* | (2006.01) |
| *B62D 29/04* | (2006.01) |
| *B62D 63/04* | (2006.01) |
| *B29C 51/02* | (2006.01) |
| *B29C 70/34* | (2006.01) |
| *B32B 5/12* | (2006.01) |

(52) U.S. Cl.
CPC .......... *B29C 70/465* (2013.01); *B29C 70/506* (2013.01); *B32B 3/04* (2013.01); *B32B 3/12* (2013.01); *B32B 3/28* (2013.01); *B32B 5/02* (2013.01); *B32B 27/08* (2013.01); *B32B 37/06* (2013.01); *B32B 37/10* (2013.01); *B32B 38/1808* (2013.01); *B32B 38/1858* (2013.01); *B60R 21/04* (2013.01); *B62D 63/04* (2013.01); *B29C 51/02* (2013.01); *B29C 70/345* (2013.01); *B32B 5/12* (2013.01); *B32B 2250/24* (2013.01); *B32B 2260/021* (2013.01); *B32B 2260/046* (2013.01); *B32B 2305/076* (2013.01); *B32B 2305/10* (2013.01); *B32B 2307/56* (2013.01); *B32B 2605/08* (2013.01)

(56) References Cited

U.S. PATENT DOCUMENTS

| | | | |
|---|---|---|---|
| 3,633,934 | A | 1/1972 | Wilfert |
| 3,842,944 | A | 10/1974 | Shiotani et al. |
| 3,887,223 | A | 6/1975 | Bez |
| 4,227,593 | A | 10/1980 | Bricmont et al. |
| 4,357,040 | A | 11/1982 | Tomioka et al. |
| 4,890,877 | A | 1/1990 | Ashtiani-Zarandi et al. |
| 5,139,297 | A | 8/1992 | Carpenter et al. |
| 5,139,843 | A | 8/1992 | Murakami et al. |
| 5,150,935 | A | 9/1992 | Glance et al. |
| 5,164,141 | A | 11/1992 | Becker et al. |
| 5,190,803 | A | 3/1993 | Goldbach et al. |
| 5,306,066 | A | 4/1994 | Saathoff |
| 5,354,604 | A | 10/1994 | Blakeman et al. |
| 5,480,729 | A | 1/1996 | Hattori et al. |
| 5,518,802 | A | 5/1996 | Colvin et al. |
| 5,529,826 | A | 6/1996 | Tailor et al. |
| 5,618,074 | A | 4/1997 | Weast |
| 5,682,667 | A | 11/1997 | Flagg |
| 5,715,917 | A | 2/1998 | Smallwood |
| 5,746,419 | A | 5/1998 | McFadden et al. |
| 5,804,511 | A | 9/1998 | Kelman et al. |
| 5,819,408 | A | 10/1998 | Catlin |
| 5,836,547 | A | 11/1998 | Koch et al. |
| 5,975,623 | A | 11/1999 | Shikimachi et al. |
| 6,050,631 | A | 4/2000 | Suzuki et al. |
| 6,158,771 | A | 12/2000 | Nusser et al. |
| 6,168,226 | B1 | 1/2001 | Wycech |
| 6,299,958 | B1 | 10/2001 | St. Julien et al. |
| 6,336,249 | B1 | 1/2002 | Plumley |
| 6,394,512 | B1 | 5/2002 | Schuster et al. |
| 6,467,822 | B1 | 10/2002 | Leng |
| 6,494,510 | B2 | 12/2002 | Okamura et al. |
| 6,503,585 | B1 | 1/2003 | Wagenblast et al. |
| 6,513,843 | B1 | 2/2003 | Frederick et al. |
| 6,540,275 | B1 | 4/2003 | Iwamoto et al. |
| 6,547,295 | B2 | 4/2003 | Vismara |
| 6,592,174 | B1 | 7/2003 | Rollin et al. |
| 6,668,513 | B2 | 12/2003 | Roberts et al. |
| 6,685,243 | B1 | 2/2004 | Evans |
| 6,746,061 | B1 | 6/2004 | Evans |
| 6,866,294 | B2 | 3/2005 | Horsch et al. |
| 6,866,331 | B2 | 3/2005 | Kropfeld |
| 6,905,136 | B2 | 6/2005 | Mdal et al. |
| 6,938,936 | B2 | 9/2005 | Moojiman et al. |
| 6,942,910 | B2 | 9/2005 | Roberts et al. |
| 7,004,502 | B2 | 2/2006 | Borroni-Bird et al. |
| 7,008,006 | B2 | 3/2006 | Steinhauser et al. |
| 7,044,514 | B2 | 5/2006 | Mustafa et al. |
| 7,086,690 | B2 | 8/2006 | Shuler et al. |
| 7,134,700 | B2 | 11/2006 | Evans |
| 7,163,243 | B2 | 1/2007 | Evans |
| 7,222,896 | B2 | 5/2007 | Evans |
| 7,434,872 | B2 | 10/2008 | Steller |
| 7,517,006 | B2 | 4/2009 | Kageyama et al. |
| 7,520,561 | B2 | 4/2009 | Nakamae et al. |
| 7,520,616 | B2 | 4/2009 | Ooba et al. |
| 7,597,383 | B2 | 10/2009 | Itou et al. |
| 7,607,720 | B2 | 10/2009 | Noyori et al. |
| 7,699,383 | B2 | 4/2010 | Fukukawa et al. |
| 7,806,448 | B2 | 10/2010 | Allen et al. |
| 7,879,435 | B2 | 2/2011 | Mett et al. |
| 8,047,603 | B2 | 11/2011 | Goral et al. |
| 8,158,539 | B2 | 4/2012 | Balthes |
| 8,303,743 | B2 | 11/2012 | Youn et al. |
| 8,322,780 | B2 | 12/2012 | Nagwanshi et al. |
| 8,336,933 | B2 | 12/2012 | Nagwanshi et al. |
| 8,430,437 | B2 | 4/2013 | Asakawa et al. |
| 8,469,417 | B2 | 6/2013 | Di Modugno |
| 8,474,583 | B2 | 7/2013 | Nagwanshi et al. |
| 8,864,216 | B2 | 10/2014 | Nagwanshi et al. |
| 9,067,550 | B2 | 6/2015 | Nagwanshi et al. |
| 9,238,347 | B2 | 1/2016 | Nelson et al. |
| 10,053,046 | B2 | 8/2018 | Villacres Mesias et al. |
| 10,072,690 | B2 | 9/2018 | Fleischheuer et al. |
| 10,232,889 | B2 | 3/2019 | Kellner |
| 10,328,882 | B2 | 6/2019 | Schmitt |
| 2001/0026072 | A1 | 10/2001 | Sato et al. |
| 2002/0017805 | A1 | 2/2002 | Carroll, III et al. |
| 2002/0043809 | A1 | 4/2002 | Msmara |
| 2002/0050413 | A1 | 5/2002 | Renault |
| 2002/0070584 | A1 | 6/2002 | Carroll, III et al. |
| 2002/0121714 | A1 | 9/2002 | Preisler |
| 2002/0121718 | A1 | 9/2002 | Winget et al. |
| 2002/0121723 | A1 | 9/2002 | Preisler et al. |
| 2002/0121787 | A1 | 9/2002 | Tarahomi et al. |
| 2002/0125725 | A1 | 9/2002 | Satou |
| 2002/0129981 | A1 | 9/2002 | Satou |
| 2002/0180223 | A1 | 12/2002 | Msmara et al. |
| 2003/0008105 | A1 | 1/2003 | Haack et al. |
| 2003/0034658 | A1 | 2/2003 | Cate et al. |
| 2003/0067179 | A1 | 4/2003 | Bastien et al. |
| 2003/0164618 | A1 | 9/2003 | Gentle |
| 2004/0037625 | A1 | 2/2004 | Corrias et al. |
| 2004/0051321 | A1 | 3/2004 | Hanai et al. |
| 2004/0094684 | A1 | 5/2004 | Sailer |
| 2004/0124643 | A1 | 7/2004 | Matsumoto et al. |
| 2004/0174025 | A1 | 9/2004 | Converse et al. |
| 2004/0232591 | A1 | 11/2004 | Dajek et al. |
| 2006/0032579 | A1 | 2/2006 | Ohata |
| 2006/0119116 | A1 | 6/2006 | Goertz |
| 2006/0181089 | A1 | 8/2006 | Andre et al. |

(56) References Cited

U.S. PATENT DOCUMENTS

| | | | |
|---|---|---|---|
| 2006/0286384 A1* | 12/2006 | Crawford | C08J 5/18 528/193 |
| 2007/0090666 A1 | 4/2007 | Brennecke et al. | |
| 2007/0122510 A1 | 5/2007 | Mendiboure et al. | |
| 2007/0134452 A1 | 6/2007 | Merkle et al. | |
| 2007/0175571 A1 | 8/2007 | Rubin et al. | |
| 2007/0257497 A1 | 11/2007 | Heatherington et al. | |
| 2008/0001434 A1 | 1/2008 | Henkelmann | |
| 2008/0048462 A1 | 2/2008 | Zabik | |
| 2008/0098601 A1 | 5/2008 | Heinz et al. | |
| 2008/0138586 A1 | 6/2008 | Mooijman et al. | |
| 2008/0156425 A1 | 7/2008 | Howe et al. | |
| 2008/0238140 A1 | 10/2008 | Kejha | |
| 2008/0246277 A1 | 10/2008 | Gallagher et al. | |
| 2008/0286522 A1 | 11/2008 | Khan et al. | |
| 2008/0317988 A1 | 12/2008 | Mooijman et al. | |
| 2009/0081462 A1 | 3/2009 | Miyoshi et al. | |
| 2009/0160203 A1 | 6/2009 | Garg et al. | |
| 2009/0167055 A1 | 7/2009 | Niezur et al. | |
| 2009/0309387 A1 | 12/2009 | Goral et al. | |
| 2010/0173126 A1 | 7/2010 | Malek et al. | |
| 2010/0187865 A1 | 7/2010 | Malek et al. | |
| 2010/0201040 A1 | 8/2010 | Guichard et al. | |
| 2010/0228001 A1 | 9/2010 | Mortimer | |
| 2010/0244472 A1 | 9/2010 | Gonin et al. | |
| 2010/0327630 A1 | 12/2010 | Klimek et al. | |
| 2011/0133517 A1 | 6/2011 | Leanza | |
| 2011/0316307 A1 | 12/2011 | Di Modugno | |
| 2012/0112479 A1 | 5/2012 | Nagwanshi et al. | |
| 2012/0153669 A1 | 6/2012 | Nagwanshi et al. | |
| 2012/0193939 A1 | 8/2012 | Howe et al. | |
| 2012/0269999 A1 | 10/2012 | Kind et al. | |
| 2012/0309247 A1 | 12/2012 | Kleine et al. | |
| 2013/0052392 A1 | 2/2013 | Radlmayr et al. | |
| 2013/0106139 A1 | 5/2013 | Nagwanshi et al. | |
| 2013/0164501 A1 | 6/2013 | Jung et al. | |
| 2013/0181373 A1 | 7/2013 | Stock et al. | |
| 2013/0256941 A1* | 10/2013 | Buehlmeyer | B29C 51/02 425/384 |
| 2013/0257098 A1 | 10/2013 | Matsuda et al. | |
| 2013/0309442 A1 | 11/2013 | Ruby et al. | |
| 2014/0084633 A1 | 3/2014 | Matsuda et al. | |
| 2014/0103670 A1 | 4/2014 | Iijima et al. | |
| 2014/0117582 A1* | 5/2014 | Wilkerson | B29C 70/52 425/112 |
| 2014/0183784 A1* | 7/2014 | Bartel | B29C 70/50 264/258 |
| 2014/0190445 A1 | 7/2014 | Reese et al. | |
| 2014/0203577 A1 | 7/2014 | Nagwanshi et al. | |
| 2014/0203592 A1 | 7/2014 | Nagwanshi et al. | |
| 2015/0174885 A1* | 6/2015 | Khan | B29B 15/125 427/209 |
| 2015/0273794 A1* | 10/2015 | Chien | B32B 5/26 428/113 |
| 2015/0360733 A1 | 12/2015 | Nagwanshi et al. | |
| 2017/0008206 A1 | 1/2017 | Schoenhammer et al. | |
| 2017/0182874 A1 | 6/2017 | Shimasaki et al. | |
| 2017/0217393 A1 | 8/2017 | Mohapatra et al. | |
| 2017/0327157 A1 | 11/2017 | Jaunasse et al. | |

FOREIGN PATENT DOCUMENTS

| | | |
|---|---|---|
| CN | 2044543 U | 9/1989 |
| CN | 1479680 A | 3/2004 |
| CN | 1747858 A | 3/2006 |
| CN | 101346259 A | 1/2009 |
| CN | 101529118 A | 9/2009 |
| CN | 101679654 A | 3/2010 |
| CN | 101797822 A | 8/2010 |
| CN | 101939558 A1 | 1/2011 |
| CN | 102561230 A | 7/2012 |
| CN | 102785438 A | 11/2012 |
| DE | 4115831 A1 | 11/1992 |
| DE | 102006032867 A1 | 1/2008 |
| DE | 102007038087 A1 | 2/2009 |
| DE | 102011104368 A1 | 3/2012 |
| DE | 102011109514 A1 | 2/2013 |
| EP | 0661198 A1 | 7/1995 |
| EP | 0967138 A2 | 12/1999 |
| EP | 1065108 A2 | 1/2001 |
| EP | 1104857 A1 | 6/2001 |
| EP | 1300293 A9 | 4/2003 |
| EP | 1369309 A1 | 12/2003 |
| EP | 1419936 A1 | 5/2004 |
| EP | 1473197 A1 | 11/2004 |
| EP | 1593872 A1 | 11/2005 |
| EP | 1652733 A1 | 5/2006 |
| EP | 1759959 A2 | 3/2007 |
| EP | 2380782 A1 | 10/2011 |
| EP | 2889187 A2 | 7/2015 |
| ES | 2260998 B2 | 11/2016 |
| FR | 2702432 A1 | 9/1994 |
| FR | 2859970 A1 | 3/2005 |
| FR | 2864811 A1 | 7/2005 |
| FR | 2887508 A1 | 12/2006 |
| FR | 2890361 A1 | 3/2007 |
| GB | 2375328 A | 11/2002 |
| GB | 2384217 A | 7/2003 |
| GB | 2386937 A | 10/2003 |
| JP | S61261012 A | 11/1986 |
| JP | 0454336 | 2/1992 |
| JP | H04201412 A | 7/1992 |
| JP | H07132514 A | 5/1995 |
| JP | 09020267 A | 1/1997 |
| JP | H1085842 A | 4/1998 |
| JP | 2001208120 A | 8/2001 |
| JP | 2004009726 A | 1/2004 |
| JP | 2006247237 A | 9/2006 |
| JP | 2010120167 A | 6/2010 |
| KR | 19970023007 | 5/1997 |
| KR | 1020070122301 A | 12/2007 |
| KR | 1020090042791 A | 4/2009 |
| KR | 2010056402 A | 5/2010 |
| KR | 20130031949 A | 4/2013 |
| KR | 101396822 B2 | 12/2013 |
| KR | 20140023757 A | 2/2017 |
| WO | 2005044531 A2 | 5/2005 |
| WO | 2005100100 A1 | 10/2005 |
| WO | 2005105554 A1 | 11/2005 |
| WO | 2006008150 A1 | 1/2006 |
| WO | 2006065868 A2 | 6/2006 |
| WO | 2006066966 A1 | 6/2006 |
| WO | 2006119225 A2 | 11/2006 |
| WO | 2006136743 A1 | 12/2006 |
| WO | 2008016653 A2 | 2/2008 |
| WO | 2008073522 A1 | 6/2008 |
| WO | 2010103449 A1 | 9/2010 |
| WO | 2010108015 A3 | 9/2010 |
| WO | 2012014091 A1 | 2/2012 |
| WO | 2012042396 A1 | 4/2012 |
| WO | 2012085070 A1 | 6/2012 |
| WO | 2013007386 A1 | 1/2013 |
| WO | 2014060212 A1 | 4/2014 |
| WO | 2014078499 A1 | 5/2014 |

OTHER PUBLICATIONS

International Search Report for International Application No. PCT/IB2017/058459; International Filing Date: Dec. 28, 2017; Date of Mailing: Jun. 15, 2018; 6 Pages.

Written Opinion of the International Searching Authority for International Application No. PCT/IB2017/058459; International Filing Date: Dec. 28, 2017; Date of Mailing: Jun. 15, 2018; 7 Pages.

Chinese Patent No. 101346259(A); Date of Publication: Jan. 14, 2009; Machine Translation; 17 Pages.

Chinese Patent No. 101529118(A); Date of Publication: Sep. 9, 2009; Machine Translation; 32 Pages.

Chinese Patent No. 101939558(A1); Date of Publication: Jan. 5, 2011; Machine Translation; 20 Pages.

Chinese Patent No. 1479680(A); Date of Publication: Mar. 3, 2004; Machine Translation; 14 Pages.

(56) References Cited

OTHER PUBLICATIONS

Chinese Patent No. 1747858(A); Date of Publication: Mar. 15, 2006; Machine Translation; 24 Pages.
English Abstract of KR2010056402(A); Date of Publication: May 27, 2010; 2 Pages.
European Patent No. 0661198 (A1); Publication Date: Jul. 5, 1995; Abstract Only; 2 Pages.
European Patent No. 1369309 (A1); Publication Date: Dec. 10, 2003; English Machine Translation; 13 pages.
European Patent No. 1419936 (A1); Publication Date: May 19, 2004; Abstract Only; 1 Page.
European Patent No. 1473197 (A1); Publication Date: Nov. 3, 2004; Abstract Only: 1 Page.
European Patent No. 1652733 (A1); Publication Date: May 3, 2006; Abstract Only: 1 Page.
European Patent No. 1759959 (A2); Publication Date: Mar. 7, 2007; Machine Translation; 18 Pages.
European Patent No. 2380782(A1); Date of Publication: Oct. 26, 2011; Machine Translation; 12 Pages.
French Patent No. 2702432 (A1); Publication Date: Sep. 16, 1994; Abstract Only; 1 Page.
French Patent No. 2859970 (A1); Publication Date: Mar. 25, 2005; Abstract Only; 1 Page.
French Patent No. 2864811 (A1); Publication Date: Jul. 8, 2005; Abstract Only; 1 Page.
French Patent No. 2887508 (A1); Publication Date: Dec. 29, 2006; Abstract Only; 1 Page.
German Patent No. 102007038087(A1); Date of Publication: Feb. 12, 2009; Abstract Only; 1 Page.
German Patent No. 102011104368(A1); Date of Publication: Mar. 15, 2012; Abstract Only; 1 Page.
German Patent No. 102011109514(A1); Date of Publication: Feb. 7, 2013; Machine Translation; 21 Pages.
Grujicic et al., "Investigation of a polymer metal inter-locking technology for use in load-bearing automotive components," Multidiscipline Modeling in Materials and Structures (2010), vol. 6, No. 1, pp. 22-44.

International Patent No. 2006136743(A3); Date of Publication: Mar. 15, 2007; Abstract Only; 1 Page.
International Publication No. 2005100100 (A1); Publication Date: Oct. 27, 2005; Abstract Only; 1 Page.
International Publication No. 2006136743 (A1); Publication Date: Dec. 28, 2006; Abstract Only; 2 Pages.
International Publication No. 2013007386 (A1); Publication Date: Jul. 17, 2013; Abstract Only; 1 Page.
International Search Report for International Application No. PCT/IB2015/054518; International Filing Date: Jun. 15, 2015; Date of Mailing: Dec. 3, 2015; 7 Pages.
Japanese Patent No. 09020267 (A); Publication Date: Jan. 21, 1997; Abstract Only; 1 Page.
Japanese Patent No. 2006247237 (A); Date of Publication: Sep. 21, 2006; Abstract Only; 1 Page.
Machine Translation of CN102785438(A); Date of Publication: Nov. 21, 2012; 11 Pages.
Machine Translation of ES2260998B2; Date of Publication: Nov. 1, 2006; 4 Pages.
Machine Translation of JPH04201412(A); Date of Publication: Jul. 22, 1992; 5 Pages.
Machine Translation of KR101396822(A); Date of Publication: Dec. 12, 2013; 11 Pages.
Machine Translation of KR20140023757(A); Date of Publication: Feb. 27, 2017; 19 Pages.
Machine Translation of WO2012085070(A1); Date of Publication: Jun. 28, 2012; 12 Pages.
Machine Translation of WO2014060212A1; Date of Publication: Apr. 24, 2014; 17 Pages.
Witteman, Willibroordus J.; "Improved Vehicle Crashworthiness Design by Control of the Energy Absorption of Different Collision Situations"; Dictoral Dissertation, Eindhoven University of Technology; 1999; 191 Pages.
Written Opinion of the International Searching Authority for International Application No. PCT/IB2015/054518; International Filing Date: Jun. 15, 2015; Date of Mailing: Dec. 3, 2015; 7 Pages.
Zoellner et al., "Plastic-Metal Hybrid—A New Development in the Injection Molding Technology," ANTEC (2002), 5 Pages.

\* cited by examiner

METHOD OF MAKING A LAMINATE, AN ENERGY ABSORBING DEVICE, AN ENERGY ABSORBING DEVICE COMPOSITION, AND A FORMING TOOL

CROSS REFERENCE TO RELATED APPLICATIONS

This application is a Divisional of application Ser. No. 15/319,571 filed Dec. 16, 2016, which is a National Stage Application under 35 U.S.C. § 371 of International Application No. PCT/IB2015/054518, which claims priority to Application No. PCT/IB2015/054518, filed Jun. 15, 2015, which claims priority to each of U.S. Provisional Application No. 62/012,515, filed Jun. 16, 2014, U.S. Provisional Application No. 62/012,522, filed Jun. 16, 2014, and India Application No. 1618/DEL/2014, filed Jun. 16, 2014, the contents of all of which are hereby incorporated herein by reference in their entirety.

BACKGROUND

The present disclosure relates to the structural body of a vehicle and to weight reduction thereof, particularly while meeting high-speed front side and rollover vehicle crash countermeasures.

Automotive manufacturers are continuing to reduce the weight of passenger cars to meet the increasing government regulations on fuel efficiency and reducing emissions. The structural body of a vehicle (the structure forming what is commonly known as the body-in-white (BIW)), is a vehicle's largest structure, and therefore ideal for weight reduction considerations. Body-in-white refers to the welded sheet metal components which form the vehicle's structure to which the other components will be married, i.e., the engine, the chassis, the exterior and interior trim, the seats, etc. Reducing body weight, however, involves a trade-off with body stiffness, a key characteristic which influences vehicle dynamics, durability, and crash worthiness.

This generates the need to design a BIW having reduced weight, without sacrificing durability and crash worthiness.

BRIEF DESCRIPTION

Disclosed, in various embodiments are forming tools, laminates, shells, and energy absorbing devices and methods of making and using the same.

In an embodiment, an energy-absorbing device can comprise: a polymer reinforcement structure, wherein the polymer reinforcement structure comprises a polymer matrix and chopped fibers; and a shell comprising 2 walls extending from a back and forming a shell channel, wherein the shell comprises continuous fibers and a resin matrix; wherein the polymer reinforcement structure is located in the shell channel.

In an embodiment, a structural body of a vehicle can comprise: a hollow vehicle component comprising walls that define a cavity, wherein the vehicle component has a component length; and the energy-absorbing device; wherein the energy-absorbing device is located in the cavity.

In an embodiment, a vehicle can comprise: the structural vehicle component; and the energy-absorbing device located in the structural vehicle component; an engine; and a drive mechanism.

In another embodiment, a vehicle can comprise: the structural vehicle component, wherein the structural vehicle component is the energy-absorbing device, an engine; and a drive mechanism.

These and other non-limiting characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
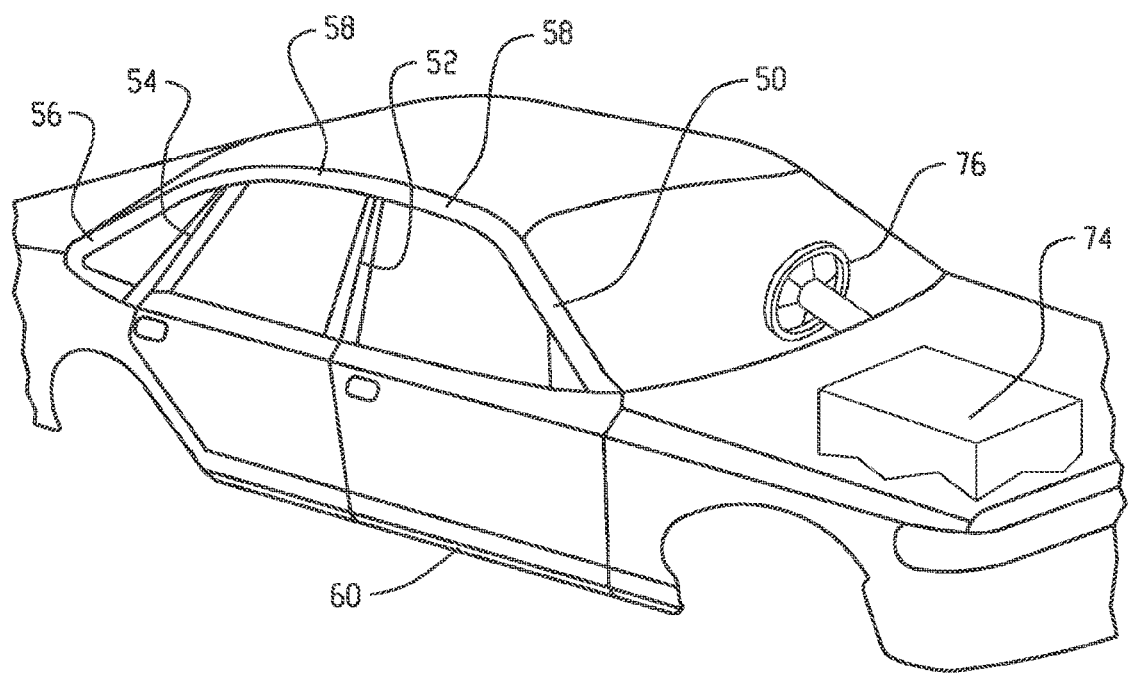
FIG. 1 is a partial perspective view of exemplary areas of the BIW that can be reinforced.

Many attempts have been made to provide BIW component for automotive vehicles, which are lighter and could be able to absorb a major portion of impact energy during high-speed crashes. Use of high strength steel in BIW components has been increasing rapidly. Lighter metal like aluminum and magnesium have also been explored. The wall thickness of these various BIW components is sufficient to impart the desired structural integrity to that element to meet its desired function and various regulatory requirements.

With foam filled components, a hollow part is filled with foam to its full volume, and the expanded foam material provides the connection to the wall and thus the absorption of force and distribution of load. The reinforcement characteristics are based on the material properties of the foam.

However, foam reinforcement systems require a chemical reaction that must be adapted to the production process of the vehicle, particularly in terms of the incident temperatures. The reinforcement function thus depends on accurate and constant adherence to the process parameters. Another disadvantage is that the structural parts can no longer be disconnected from one another easily, making recycling more difficult. In addition, completely filling the space with foam brings about a more or less homogeneous reinforcement effect, without the ability to take three-dimensional varying design requirements into account.

In crush countermeasure systems that include steel stampings fixed to sheet metal via thermoset adhesive, the adhesive will activate and expand as the body goes through the ovens that bake the paint. Therefore, this system is not optimal. The stampings are heavy and excessive adhesive would generally need to be applied to assure a solid bond from the countermeasure to the body.

Some crush countermeasure systems include steel stampings that are fixed to the sheet metal via thermoset adhesive. The adhesive will activate and expand as the body goes through the ovens that bake the paint. This system is not optimal. The stampings are heavy and excessive adhesive is applied to assure a solid bond from the countermeasure to the body. Another system includes steel stampings that are fixed to the sheet metal via over mold injection mold design. The steel structures were provided with draft and material overflow provision. Once part is cooled and there forms a physical/mechanical bonding between the steel and polymers.

It would be beneficial to provide lightweight BIW components comprising crush countermeasures that is lighter than aforementioned solutions and provide ability to absorb more impact energy and/or protecting motor vehicle occupants. The crush countermeasures, e.g., energy absorbing devices, can improve structural integrity, for example, by reducing excessive deformation and improving crashworthiness during a vehicle crash scenario. It would also be beneficial to provide a crush countermeasure that may be easily manufactured and used in a motor vehicle without the use of additional processing steps.

In addition to the BIW components, reducing the weight while retaining the structural integrity of other vehicle components is also desired. Some other vehicle components that can benefit from the energy-absorbing device disclosed herein include an controller (e.g., control arms), engine block, oil pump cover, as well as other components that can benefit from a reduced weight high structural integrity element. As with the BIW components, these vehicle components can either be replaced by the energy-absorbing device, or the energy-absorbing device can be located in a hollow portion of the component.

As mentioned above, it is desirable to reduce the weight of a vehicle without compromising structural integrity and durability. Therefore, it is desirable to reduce the amount of metal employed in the vehicle while not sacrificing strength. Employed throughout the vehicle are hollow metal structural elements (e.g., beams (e.g., bumper beam), rails (e.g., roof rail), pillars (e.g., "A" pillar, "B" pillar, "C" pillar, "D" pillar), rockers (e.g., floor rocker), bars (e.g., floor crossbars, and cross bars in chassis ladder), and so forth). For example, refer to FIG. 1, which illustrates the locations of the roof rail 58, "A" pillar 50, "B" pillar 52, "C" pillar 54, "D" pillar 56, and floor rocker 60. Disclosed herein are energy-absorbing devices, e.g., reinforcement for BIW components. Some examples of possible locations for the energy-absorbing device are illustrated in FIG. 2, locations 70, which further illustrates a drive mechanism 76 and engine 74. Desirably, energy-absorbing devices are lighter than metal-plastic hybrid reinforcements and provide better crash resistance than all plastic reinforcement, metal-plastic hybrid reinforcement, or foam reinforcement.

The energy-absorbing device, e.g., BIW component, is a hybrid of continuous fiber reinforced-polymer composite and short/long chopped fiber reinforced composite material solution that can be positioned in hollow channels of the BIW components. This hybrid structure comprises a shell of continuous fiber, reinforced polymer over-molded with structure of chopped fiber (e.g., chopped short fiber (e.g., fibers having a length of less than 1 millimeters (mm)) and/or chopped long (e.g., fibers having a length of 1 to 10 mm, specifically, 3 to 5 mm) fiber) reinforced thermoplastic. The structure formed from the chopped fiber reinforced material can have various geometries that enable the desired energy absorption characteristics, e.g., rib pattern (for example a cross-rib pattern, honeycomb geometry, and so forth).

The energy-absorbing device can be formed, for example, by making shell structure of continuous fiber reinforced-polymer through various methods. The continuous fiber reinforced-polymer can comprise fiber fabrics and/or unidirectional (UD) tapes, collectively referred to as fiber structure. UD tapes can have greater than or equal to 90%, specifically, greater than or equal to 99% of the fibers oriented in the same direction. Fabrics have fibers in a single plane and oriented in at least two directions (e.g., a weave). The fiber structure (e.g., fabrics and tapes) can be formed into laminate(s) (also referred to as a sheet), wherein the laminate can be formed into intermediate(s), preform(s)), and the like. Individual layers comprise a ratio of resin matrix to fibers of 60/40 to 40/60 ratio by weight, specifically, 55/45 to 45/55, 60/40 to 40/60 ratio by weight, for example, 50/50 ratio by weight. This ratio can be attained by forming the layer using a volume ratio of resin to fibers of 70/30 to 30/70, preferably 65/35 to 35/65, for example, 60/40. For example, a resin matrix/fiber ratio by density of 40/60 can yield a 50/50 ratio by weight with a 3,000 tow or 3,000 twill weave. The specific ratio can be dependent on the materials used and the volume density of the fibers (e.g., the fabric). The specific amounts can readily be determined from the information herein.

Figure 6:
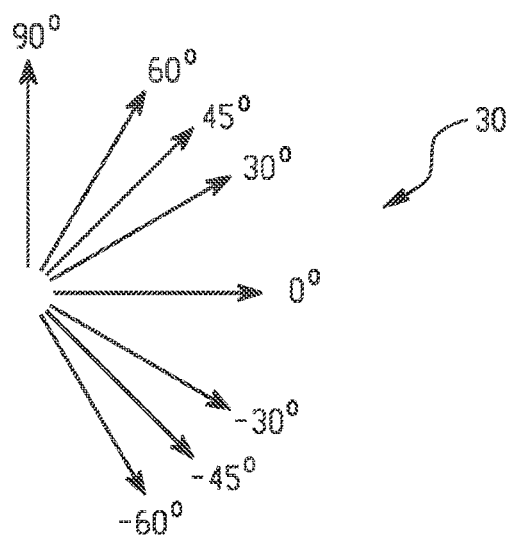
FIG. 6 is an illustration of possible fiber orientation angles for the UD materials and laminates.

When laying up the fiber structures, each subsequent layer can be oriented such that the fibers extend in the same direction as in the first layer (i.e., oriented at 0 degrees with respect to the first layer), or at a different angle than the fibers of the prior layer, e.g., at 45 degrees or 90 degrees with respect to the prior layer. Therefore, the layup (and/or the lamina) can be arranged in various orientations with respect to one another to attain a desired structural integrity, e.g. 0 degrees and 90 degrees (also referred to as "0/90"), (0/90/0), (0/45/−45), 0/60/−60), (0/45/90/0), and so forth, with an alternating 0 and 90 degree being desirable. Also desirable, the layup is a "balanced" layup comprising multiple layers with alternating fiber direction from one layer (i.e., fabric structure) to the next layer until the center of the layup then the alternation stops and reverses itself (e.g., (0/90/0/90/90/0/90/0), (0/90/45/0/0/45/90/0), (0/90/0/0/90/0) or (0/60/90/90/60/0)). FIG. 6 illustrates laminate/layup fiber orientations, wherein the first layer is considered to be oriented at 0 (i.e., zero degrees). Each subsequent fiber structure is oriented such that the fiber direction is at an angle with respect to the fiber direction of the first fiber structure. The desired combination of fiber angles is dependent upon the desired stiffness of the shell.

The number of layers employed is based upon the desired thickness and structural integrity of the shell. The shell can have a total thickness of 0.2 to 10 mm, specifically, 0.3 to 3 mm, more specifically, 0.5 mm to 2 mm, and still more specifically, 0.5 mm to 1.5 mm. Each layer can have a thickness of 0.1 to 0.4, for example, 0.1 to 0.2 mm.

Optionally, all of the fiber structures of the layup can have the same type of fibers (e.g., composition and/or diameter), or some fiber structure(s) can have a different type of fiber (e.g., composition and/or diameter).

The lay-up can be formed to produce a shell. The shell can then be overmolded with chopped fiber reinforced polymer material to form reinforcing elements (e.g., ribbed or honeycomb structure), in the shell.

The energy-absorbing device can then be used in a BIW component to provide structural integrity (e.g., in the B-pillar).

For high-speed front crash (e.g., a speed of greater than or equal to 29 kilometers per hour (kmph)), front portion of the vehicle chassis (e.g., bumper beam, energy absorber, and rails), absorbs maximum amount of impact energy. For high-speed side crashes B-pillar, floor rocker, and floor crossbars play key role in energy absorption. For rollover or roof-crush the A-pillar, B-pillar, and roof rails play key role in impact energy absorption. Generally above-mentioned components are hollow metal sections. Depending upon the necessary structural integrity of the particular element, the energy-absorbing device can replace the element, or can be inserted into the hollow cavity of the element. If the energy-absorbing device is located in the element, the thickness of the element can be reduced, thereby reducing vehicle weight. The disclosed crush countermeasure provides impact resistance and/or reinforcement characteristics in a lighter weight structure as compared to prior systems composed entirely of metal. The crush countermeasure provides a lightweight crush system having comparable protection to current all metal systems. As such, the overall weight of a vehicle is reduced without any compromise on the safety considerations to passengers.

Disclosed are energy-absorbing devices comprising a shell comprising continuous fibers in a polymeric matrix, and a polymer reinforcement structure inseparable from the shell, wherein the device can be located in a structural vehicle component (e.g., a BIW component). As used herein, "inseparable" refers to an inability to separate the components without damage to one or both of the components. The device can be located throughout the structural vehicle component, in strategic locations within the structural vehicle component ("localized"), or can replace the structural vehicle component. BIW components that can be reinforced include the beam(s), rail(s), pillar(s), chassis, floor rocker, and cross-bar(s), as well as combinations comprising at least one of the foregoing, e.g., the junction of the A-pillar and the floor rocker. Optionally, the device can be employed to reinforce other structural vehicle components besides the BIW components, such as an controller (e.g., control arms), engine block, oil pump cover, as well as other components, as well as combinations comprising at least one of the foregoing.

The shell can form a channel defined by greater than or equal to 1 wall for example 3 sided U channel. The channel can have, for example 3 sides, or 4 sides, with a channel therethrough, such that the channel is open on each end. Optionally, side wall can include opening though the wall such that, when the reinforcement is formed, molten polymer can pass from within the cavity, through the opening, and solidify to further secure the polymer reinforcement structure within the shell. Optionally, openings (e.g., small openings) around the free edges of channel, such that the molten plastic can flow over edges and solidify to further secure channel and reinforcement.

The number of holes can be greater than or equal to one, specifically greater than or equal to two, e.g., 2 to 4 holes, for ease of polymer flow inside out. The hole diameter (along a major axis) can be up to 20 mm (e.g., 0.5 mm to 20 mm), specifically, 1 mm to 10 mm, and more specifically, 2 mm to 7 mm (e.g., 5 mm).

The polymer reinforcement structure can have a honeycomb structure, e.g., an array of columns and channels. The combs of the structure can be a shape having greater than or equal to 5 sides, such as pentagonal, hexagonal, heptagonal, and octagonal, and so forth, geometries, as well as combinations comprising at least one of the foregoing geometries, and specifically a hexagonal geometry. Optionally, the channels of the honeycomb structure extend from one end of the structure to the other end of the structure, so that the structure is open on both ends, and wherein one end (e.g., the second end of the channel) can optionally be disposed in physical contact with a side of the shell, thereby effectively blocking the second end. Polymer honeycombs can be made by bonding extruded polymer tubes together, injection molding the polymer honeycombs, extruding the honeycomb structure, or otherwise formed. For example, the element can be a co-extruded component having combs of the same or different material, e.g., adjacent combs can comprise a different material composition. Optionally, some or all of the combs have foam therein. In other words, the combs can, individually, be hollow or filled, such that the structural integrity can be modified by filling particular combs, by using different polymer for particular combs, or a combination comprising at least one of the foregoing. One possible fill material is foam. Desirably, the honeycomb structure is formed by overmolding the shell using an injection molding process.

The polymer reinforcement structure can further or alternatively comprise a rib structure. For examples, ribs can extend across the channel of the shell, between sidewalls and/or a back wall. Various rib designs are possible, including triangular, wave, diagonal, crossed, and the like. For example, the ribs can form a triangular, rectangular, "X", or other structure.

The shell and the polymer reinforcement structure can, independently, comprise various polymeric materials, e.g., thermoplastic, thermoset and combinations comprising at least one of the foregoing. The particular material can be chosen based upon its properties, the desired location in the vehicle, and the characteristics of that location. For example, in some embodiments, the material can have moderate stiffness (e.g., Young's modulus of 0.8 gigaPascals (GPa) to 30 GPa, specifically, 3 GPa to 15 GPa, for example 7.0 GPa), good elongation (e.g., greater than 1% elongation), chemical resistance and/or heat resistance under vehicle manufacturing conditions (e.g., welding, painting, etc., for example, at temperatures 400° F. for 30 minutes, which enables the polymer reinforcement structure to maintain integrity as the part travels with the auto body through paint bake). Examples of polymers include thermoplastic materials as well as combinations comprising thermoplastic materials. Possible thermoplastic materials include polycarbonate; polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride (PVC); high impact polystyrene (HIPS); polyethylene (e.g., low/high density polyethylene (L/HDPE)); polypropylene (PP) (e.g., expanded polypropylene (EPP)); polyetherimide; and thermoplastic olefins (TPO); as well as combinations comprising at least one of the foregoing. For example, the polymer reinforcement structure can comprise Noryl™ GTX resin, LEXAN™ resin, ULTEM™ resin, VALOX™ resin, CYCOLAC™ resin, and/or STAMAX™ resin, which are commercially available from SABIC. Desirably, the polymer reinforcement structure comprises polypropylene, and/or blends of polyphenylene ether/polyamide. The polymer reinforcement structure can optionally be reinforced, e.g., with fibers, particles, flakes, as well as combinations comprising at least one of the foregoing. These fibers may include glass, carbon, bamboo, aramid, kevelar etc., as well as combinations comprising at least one of the foregoing. For example, the polymer reinforcement structure can be formed from STAMAX™ materials, a long glass fiber reinforced polypropylene commercially available from SABIC. The polymer reinforcement structure and/or shell can also be made from combinations comprising at least one of any of the above-described materials and/or reinforcements, e.g., a combination with a thermoset material. Desirably, the shell comprises continuous fibers (e.g., glass, carbon, aramid, kevelar, as well as combinations comprising at least one of the foregoing in a polymeric matrix of polyetherimide, polyamide (nylon), polyphenylene oxide, polycarbonate, polypropylene, as well as combinations comprising at least one of the foregoing.

Good adhesion between the shell and polymer reinforcement structure, can be attained with compatibility between the polymer matrix of the shell and the polymer of the polymer reinforcement structure. For example the shell can be made of continuous carbon fiber reinforced composite with base resin of nylon, and the polymer of the polymer reinforcement structure can also include nylon resin or any other resin blended with nylon like SABIC's Noryl™ GTX. Another example, the outer shell is made of continues glass fiber reinforced composite material with polypropylene as resin matrix, and polymer reinforcement structure can comprise a polypropylene based material or short/long fiber reinforced polypropylene composite like SABIC's STAMAX™ resin.

The honeycombs' orientation with respect to the channel in the support (and also with respect to the opening through the structural element) can also be chosen to attain the energy absorption characteristics of the reinforced component (e.g., BIW component). For example, the honeycomb can form channels that can be oriented 0 degrees (e.g., parallel) to 90 degrees (perpendicular), to the major axis of the shell. The major axis is the axis extending down the channel (e.g., see FIG. 3 axis Ax). In other words, in some embodiments, the honeycombs can have a common main axis with the channel and extend parallel thereto. In other embodiments, the honeycombs can extend perpendicular to the main axis of the channel. Consequently, when the reinforcement is disposed in the structural component (also referred to herein as structural vehicle component and vehicle component), in some embodiments, the honeycombs can have a common main axis with the opening through the structural component, while in other embodiments, the honeycombs can extend perpendicular to the opening through the structural component.

The overall size of the energy-absorbing device will depend upon its location within the BIW and the size of the associated opening in the structural component. Furthermore, the characteristics of the reinforcement will depend upon the energy absorption characteristics desired in the particular area, e.g., the number of combs or ribs per unit area, the thickness of the comb walls or ribs, and the specific material of the plastic reinforcement. The density of combs (number of combs per unit area) is dependent upon the desired stiffness, crush characteristics, and materials employed. In some embodiments, the density can be 1 to 20 combs per 100 $mm^2$, specifically, 1 to 10 combs per 100 $mm^2$, and more specifically 1 to 5 combs per 100 $mm^2$. In various embodiments, the thickness of the walls of the plastic reinforcement can be 0.5 mm to 10 mm, specifically, 2 mm to 5 mm, and more specifically 2.5 mm to 4 mm. Generally, a reinforcement will comprise greater than or equal to 10 combs, specifically, greater than or equal to 20 combs, and more specifically, greater than or equal to 30 combs.

The length of the shell is dependent upon the particular area of the BIW, while the length of the polymer reinforcement structure is dependent upon the amount and location of enhanced structural integrity in the shell. The polymer reinforcement structure can have a length commensurate with the length of the shell or less than the length of the shell (e.g., can be localized; i.e., disposed only in a specific location to attain enhanced structural integrity of that location). Desirably, to maximize the weight reduction, the polymer reinforcement structure is localized so as to add the minimum amount of weight needed to attain a desired structural integrity (e.g., a structural integrity that this greater than or equal to the standard metal component without the thinner walls). The energy-absorbing device can have a length of less than or equal to 1,000 mm, specifically, less than or equal to 800 mm, and more specifically, less than or equal to 300 mm. The length of the reinforcement can be less than or equal to 80% of the length of the structural component, specifically, less than or equal to 60%, more specifically, less than or equal to 50%, and yet more specifically, 10% to 35% of the length of the structural component (i.e., the structural component that is reinforced by the energy-absorbing device). For example, the energy-absorbing device can have a length of 150 mm to 350 mm, specifically, 200 mm to 250 mm, such as for use in a pillar or rail. In other embodiments, the energy-absorbing device has a length of 500 mm to 800 mm, specifically, 600 mm to 700 mm, such as for use in a floor rocker. The structural component is a hollow metal element. The reinforcement is disposed in the hollow space. When the reinforcement is not located throughout the hollow space in the structural element, it can be attached to the structural element to inhibit the reinforcement from being dislodged during use of the vehicle or during an impact.

Some possible structural component material(s) include polymers (e.g., thermoplastic and/or thermoset), composite, metals, and combinations comprising at least one of the foregoing. Some metals include aluminum, titanium, chrome, magnesium, zinc, and steel, as well as combinations comprising at least one of the foregoing materials. The thickness of the walls of the structural component can all be the same or can be different to enhance stiffness in a desired direction. For example, one set of opposing walls can have a greater/lesser thickness than the other set of opposing walls. In some embodiments, the structural components have a wall thickness of less than or equal to 1.6 mm, specifically, 1.0 mm to 1.5 mm, and more specifically 1.3 mm to 1.4 mm. Generally, metal walls (e.g., floor rocker, rails, pillars, bumper beam, and so forth), have a wall thickness of greater than 1.8 mm. Therefore, the use of the energy-absorbing device enables a reduction in wall thickness (of the structural component) of greater than or equal to 10%, specifically, greater than or equal to 20%, and even greater than or equal to 25%.

As noted above, the reinforcement can be located in various areas of the vehicle, such as in the bumper beam(s) and/or the BIW component (such as rail(s), pillar(s), chassis, floor rocker, and cross-bar(s)), as well as combinations comprising at least one of the foregoing. The desired specific location of the reinforcement in the structural component can be determined using crash results.

The fixing measures to attach the energy-absorbing device in the structural component can be mechanical and/or chemical. Examples of mechanical fixing measures include snaps, hooks, screws, bolts (e.g., threaded bolt(s), rivets, welds, crimp(s) (e.g., the crimped metal wall). A friction fit can also be used to maintain the reinforcement in place. Chemical fixing measures can include bonding agents such as glues, adhesives, and so forth.

A more complete understanding of the components, processes, and apparatuses disclosed herein can be obtained by reference to the accompanying drawings. These FIGS. (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 2:
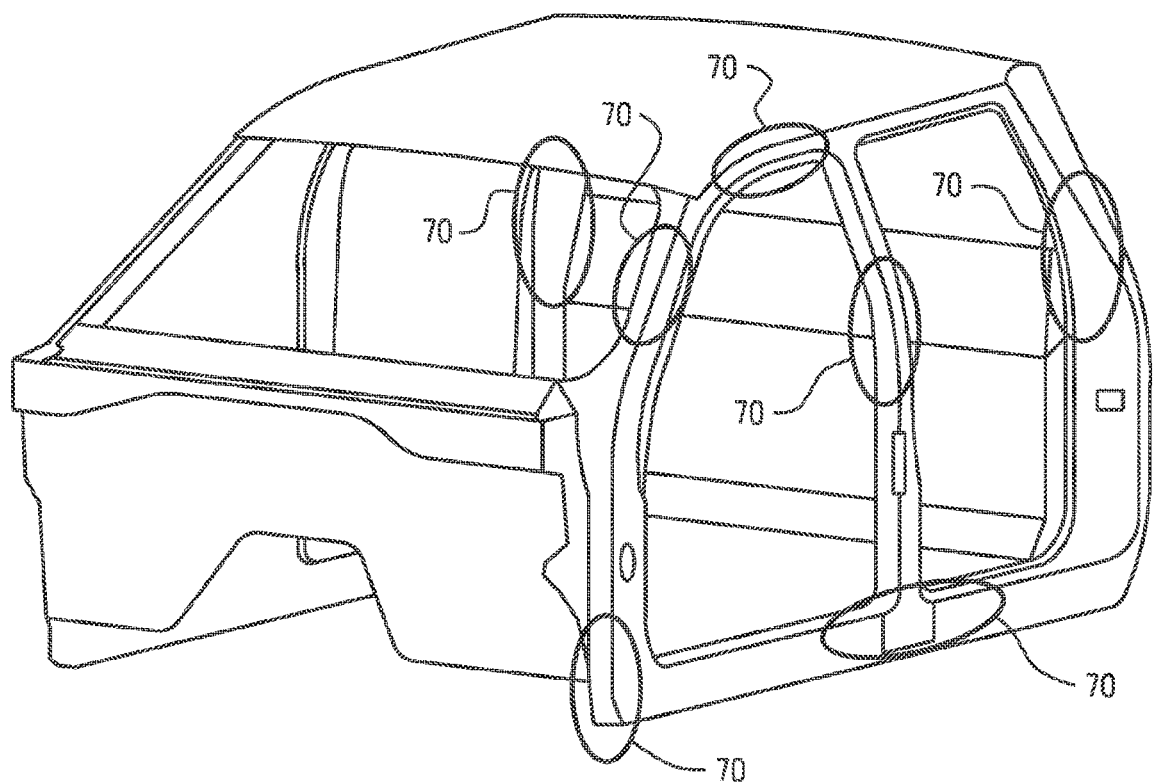
FIG. 2 is a pictorial representation of exemplary locations for the reinforcement.
Figure 12:
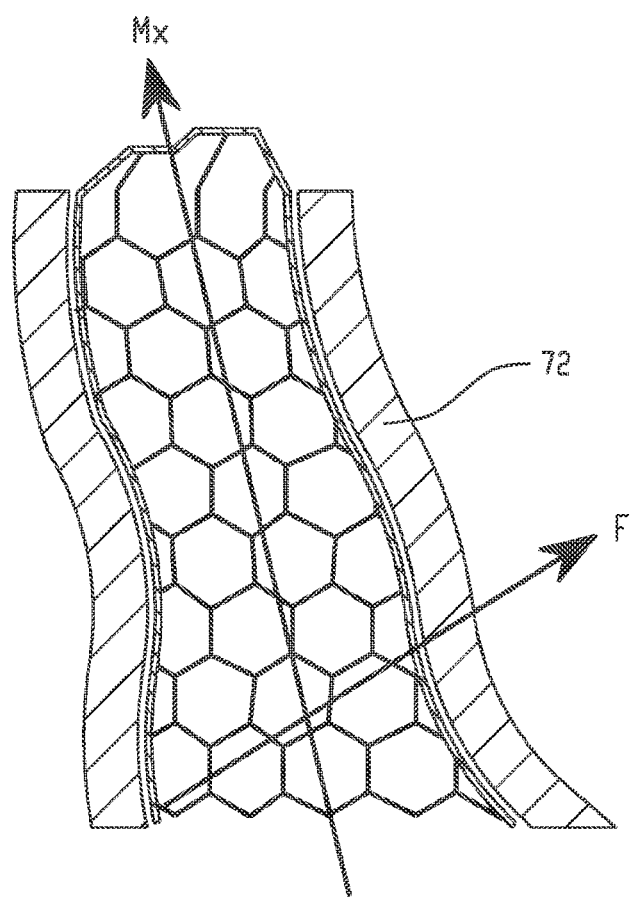
FIG. 12 is a partial, cut-away, cross-section of an example of a structural vehicle component with the energy-absorbing device located in the hollow channel and wherein the channels of the honeycomb structures are oriented across (e.g., perpendicular) to the main axis.

FIG. 1 is a pictorial representation of possible reinforcement locations in a vehicle. Here, the energy-absorbing device can be located in one or any combination of the identified locations. For example, A-Pillar 50 (e.g., near the center of the length of A-Pillar), B-Pillar 52 (e.g., near the center of the length of B-Pillar), C-Pillar 54 (e.g., near the center of the length of C-Pillar), D-Pillar 56 (e.g., near the center of D-Pillar), roof rail 58 (e.g., in multiple, separate locations along the length of the roof rail; such as centered over the window(s)), and/or floor rocker 60 (e.g., in the area where the B-Pillar meets the floor rocker), and junction of A pillar and floor rocker. For example, inserts that occupy about 10% to 30% of the length of the metal component can be located in A-Pillar 50, B-Pillar 52, the roof rail 58, and the floor rocker 60. The correct location of these reinforcements depends on crash worthiness performance for different high-speed impact requirements. As is clear from the illustrations (e.g., FIGS. 4-5), the honeycombs form channels 18. The channels can be oriented parallel to the main axis of the hollow opening formed in the body in white component, orienting the channels perpendicular to the main axis (Mx in FIG. 12) of the hollow opening formed in the body in white component provides further structural integrity.

Figure 4:
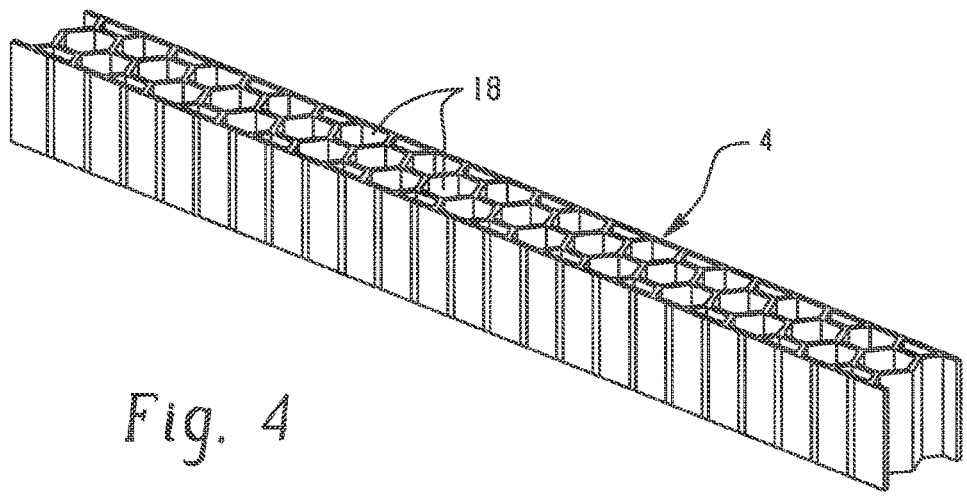
FIG. 4 is a perspective view of an embodiment of a shell.
Figure 5:
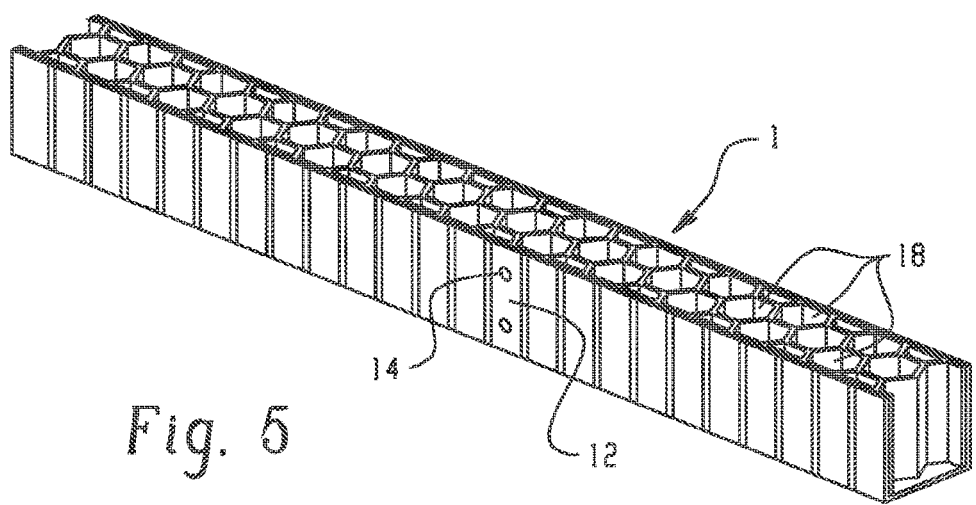
FIG. 5 is a perspective view of an embodiment of the polymer reinforcement structure of FIG. 3 located in the shell of FIG. 4.

FIG. 5 is a pictorial representation of a concept; in which localized reinforcements are proposed at identified locations of A-Pillar, B-Pillar, roof rail, and floor rocker and so forth. The details shown in FIG. 5 illustrate the formed structural component (e.g., from two metal structures welded together) formed from a hollow component (FIG. 4) with a reinforcement (FIG. 3) placed in the hollow component. The specific location of these reinforcements depends on crashworthiness performance for different high-speed impact requirements.

Figure 3:
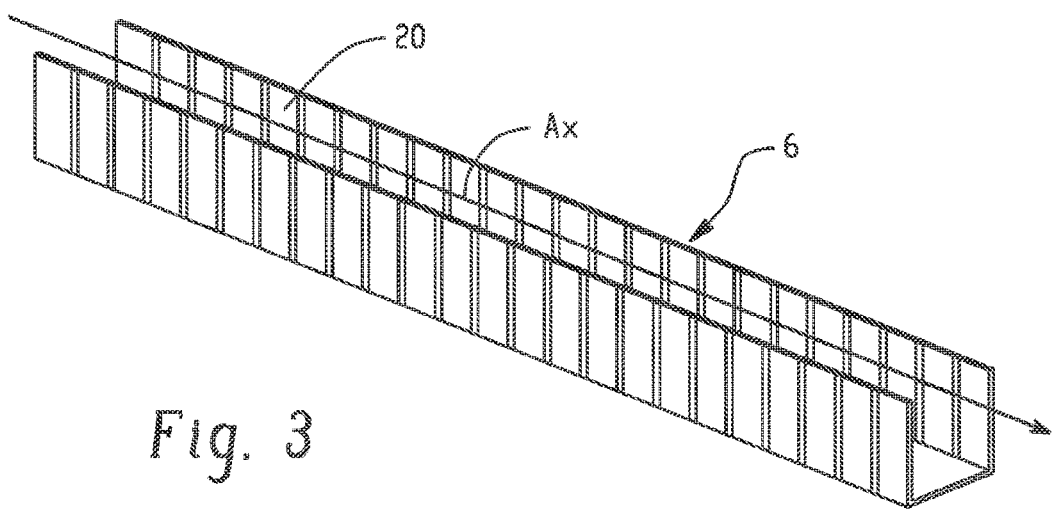
FIG. 3 is a perspective view of an embodiment of a polymer reinforcement structure.
Figure 13A:
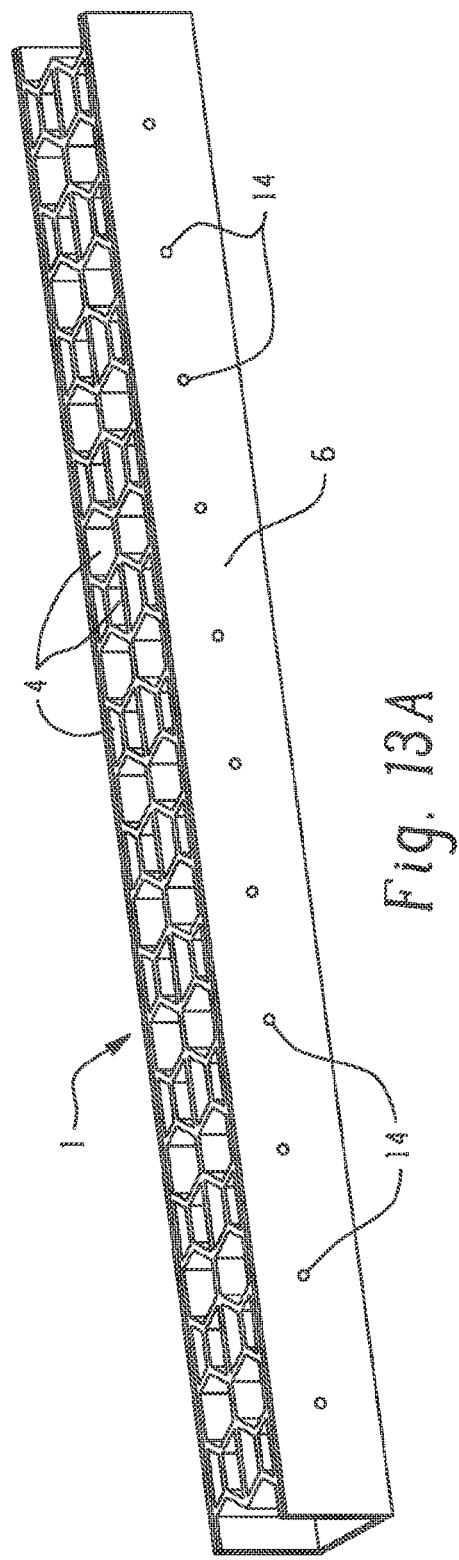
FIGS. 13A and 13B are an illustration of an example of the energy absorbing device disclosed herein comprising openings that enable mechanical attachment between the shell and the polymer reinforcement structure.
Figure 13B:
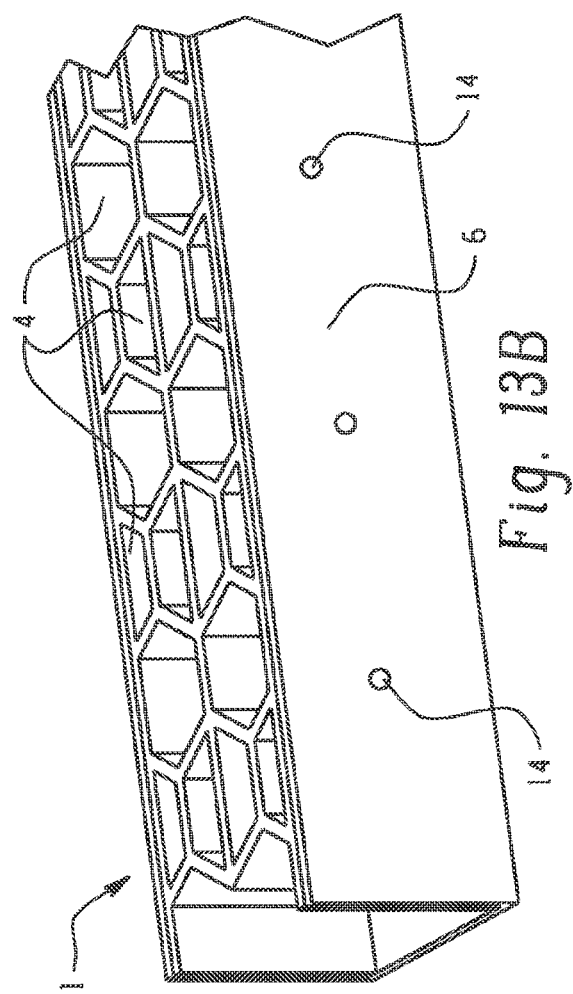

FIGS. 3-5 illustrate the elements of the reinforcement. FIG. 5 illustrates the polymer reinforcement structure 4 to be located within the channel 20 of the shell 6. As can be seen in FIGS. 13A and 13B, the shell 6 can comprise openings 14, such that the plastic of the polymer reinforcement structure 4 can pass through the opening 14 thereby forming a mechanical bond and locking the shell 6 and polymer reinforcement structure 4 together. The openings 14 can be preformed such that the continuous fibers are oriented around the openings. Alternatively, the opening 14 can be formed into the shell, by cutting through the side, and the fibers.

Figure 11:
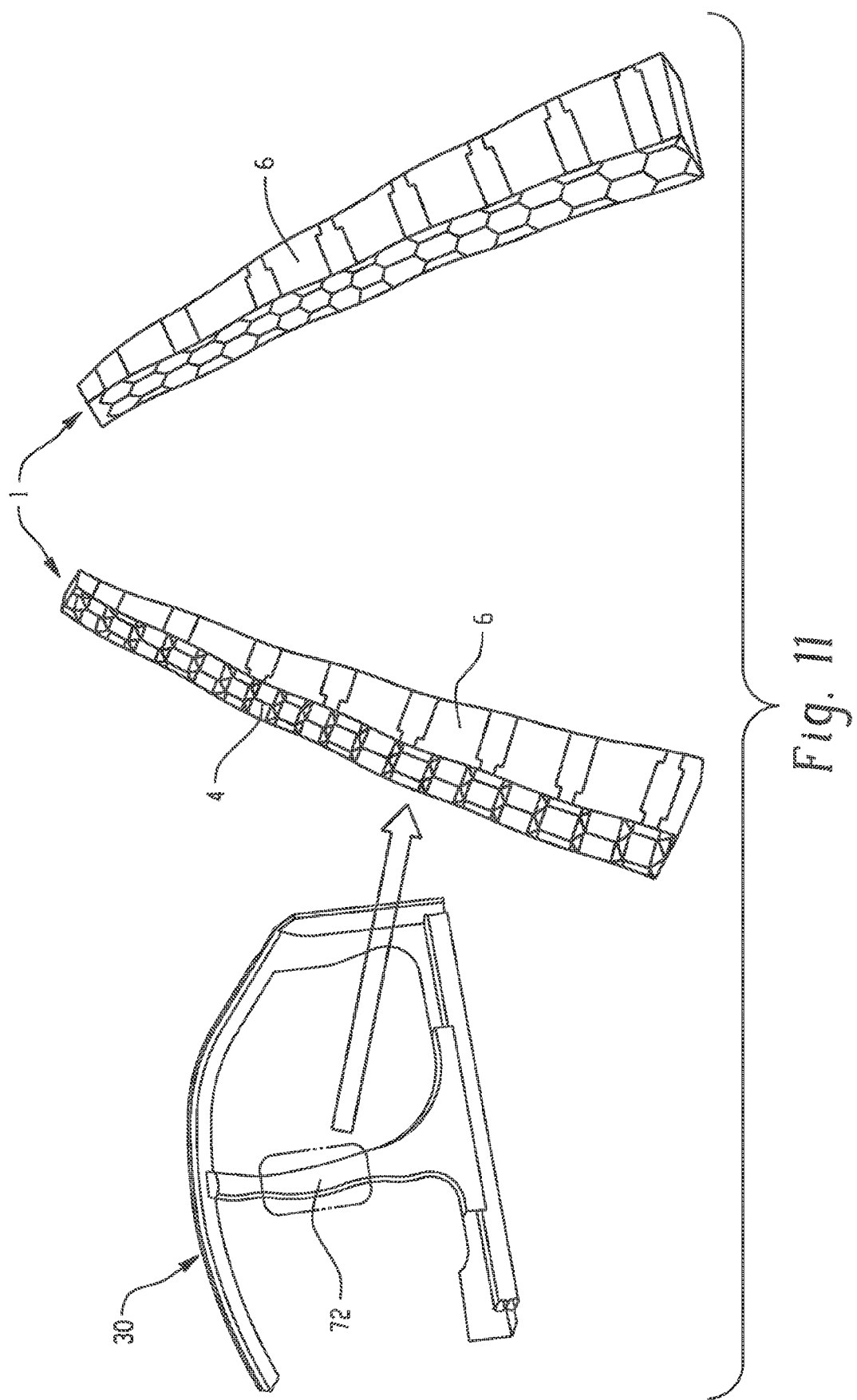
FIG. 11 is an illustration of an example of energy-absorbing device having an irregular, varied shape that is complimentary to the shape of the structural vehicle component where it will be located.

As is illustrated in FIG. 11, the energy-absorbing device 1 can have a shape that is complimentary to the shape of the opening through the structural component 72. The depth of the comb (e.g., length of the honeycomb channels 18) can be constant throughout the polymer reinforcement structure, or can vary along the length of the reinforcement, e.g., to follow the shape of the structural component 72 of the vehicle. For example, the depth of the combs of the polymer reinforcement structure 4 can decrease from one end of the polymer reinforcement structure to an opposite end of the polymer reinforcement structure.

The use of localized reinforcement (e.g., energy-absorbing device having hollow channels therethrough, located in the structural component) may enable the reduction in wall thickness of the structural component (e.g., BIW component) by greater than or equal to 15%, while retaining the structural integrity.

Figure 7:
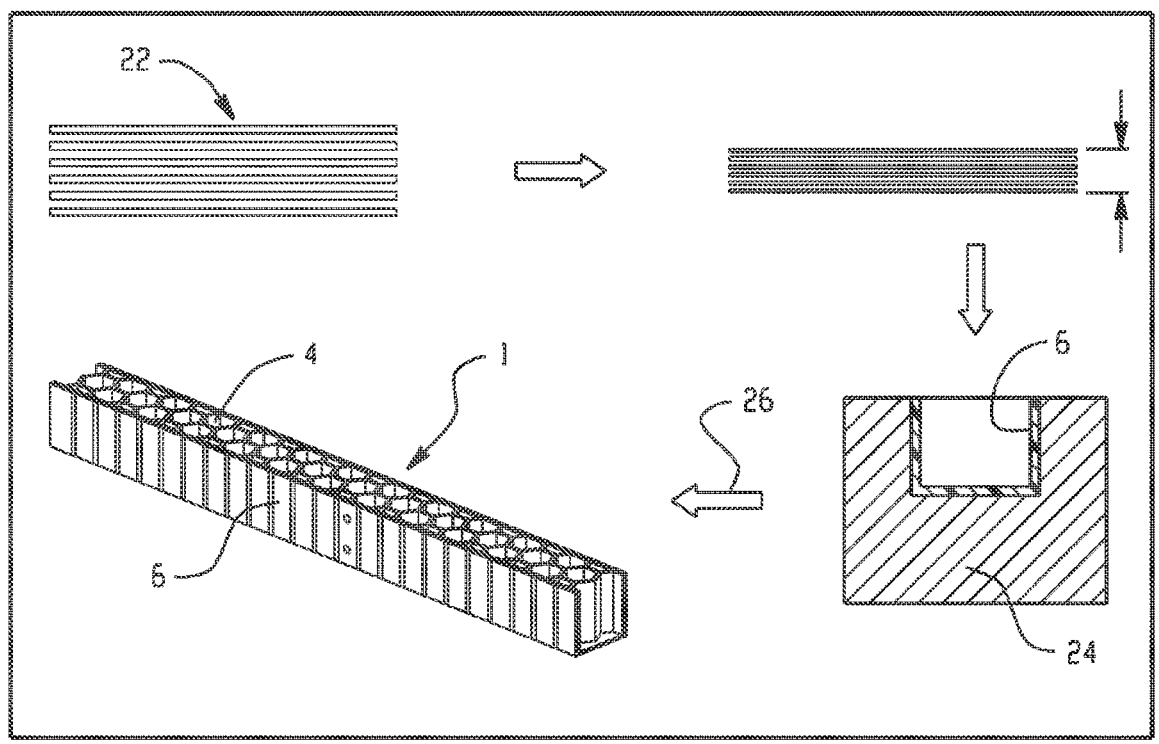
FIG. 7 is an illustration of one embodiment of making the energy-absorbing device.

FIGS. 6 and 7 illustrate some examples of making the energy-absorbing device 1. FIG. 7 illustrates making the energy-absorbing device 1 by laying up unidirectional (UD) tapes 22 of continuous fiber reinforced plastic material in the injection molding tool. The tape layup can be automated or manual. The injection molding tool can be preheated so that the polymer matrix of UD tapes reaches its glass transition temperature. Then the heated layup can be compressed for consolidation followed by solidification of the compressed lay up to form the shell 6. Then overmolding 26 of the polymer reinforcement structure 4 in the shell 6 is accomplished by injection of fiber reinforced polymer into the injection molding tool. Different orientation and number of layers of the can be designed to achieve different geometry and thickness of shell and customized properties of the shell.

Figure 8:
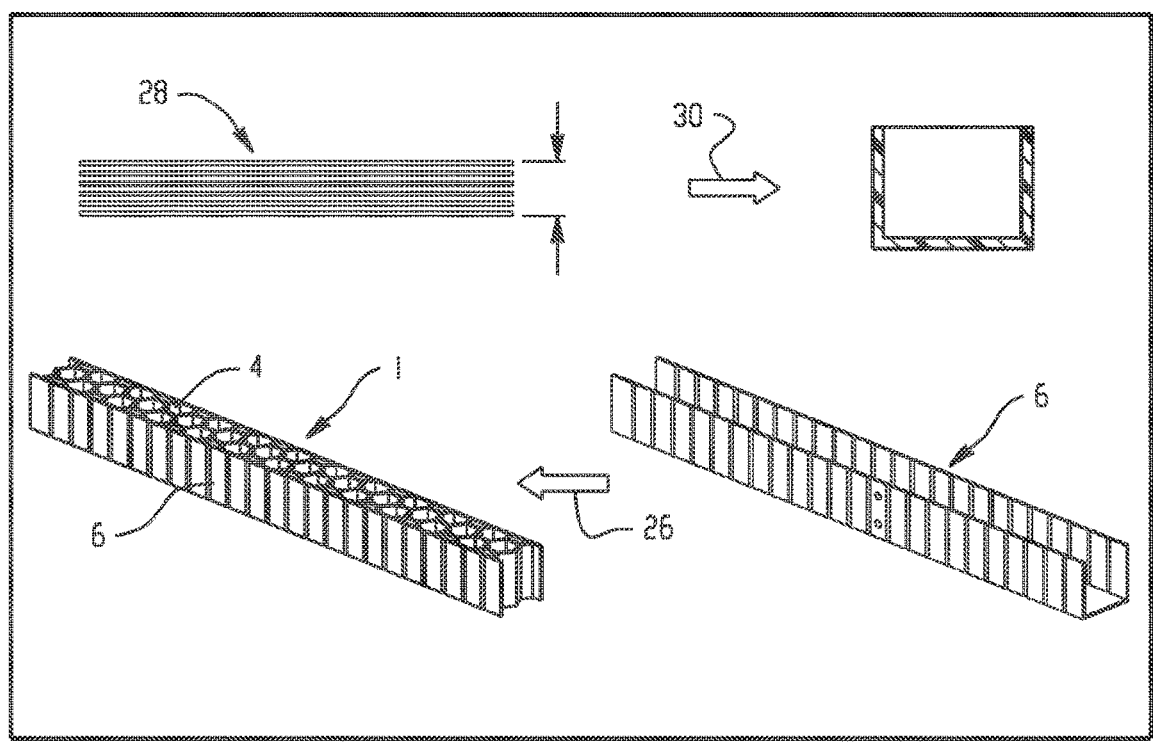
FIG. 8 is an illustration of another embodiment of making the energy-absorbing device.

FIG. 8 illustrates a process for forming an energy absorbing device. A preform laminate 28 comprising continuous fiber reinforced polymer, can be placed into a forming tool 30. The tool 30 is heated to make this laminate 28 formable, later it is compressed in the tool cavity to take required shape of shell 6. The formed shell 6 can then be placed into the injection molding tool wherein fiber reinforced plastic material can be injected to overmold the desired polymer reinforcement structure 4.

Figure 9:
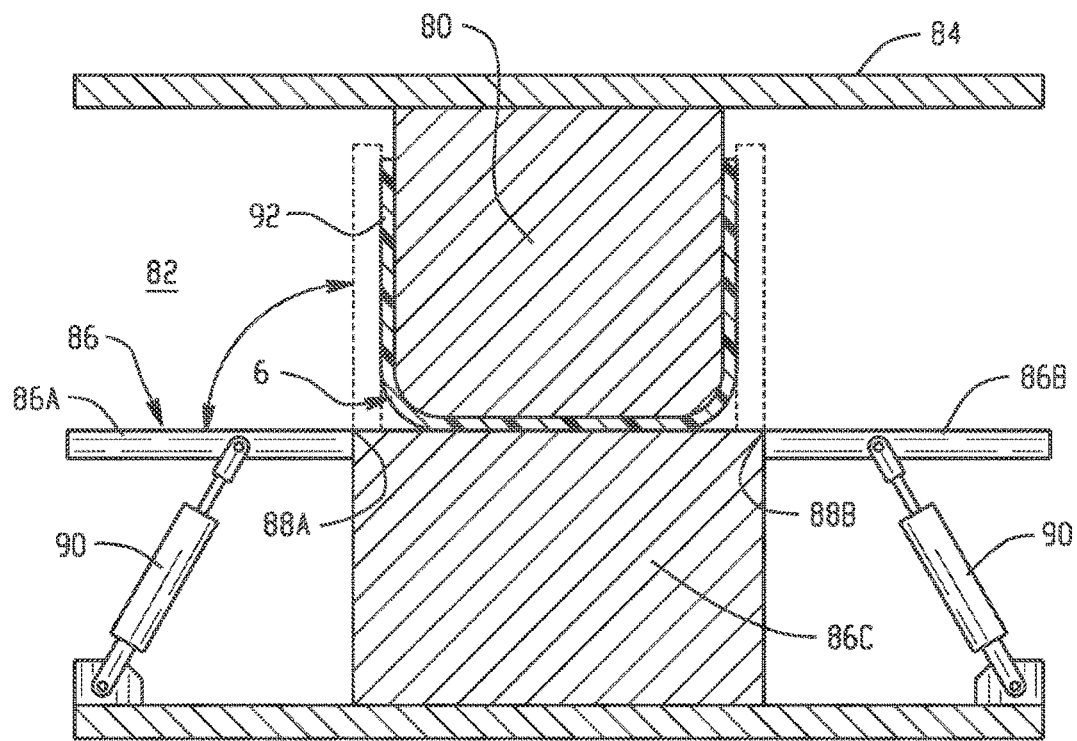
FIG. 9 is an illustration of another embodiment of a device and method for making the energy-absorbing device in, and in particular making the shell.

Now referring to FIG. 9, the shell 6 is made by laying-up UD layers or by using a laminate having a specific lay-up (e.g., with layers of continuous carbon fibers and/or glass fibers in a thermoplastic matrix). The shell can then be formed into a "U" shaped channel from the layup/laminate, e.g., using a special forming tool. The forming tool illustrated in FIG. 9, has a core 80 and cavity 82, wherein the cavity is located between a first platen 84 and a hinged platen 86, and the core 80 extends from the first platen 84 (e.g., is fixedly attached to the first platen 84), into the cavity 82, with a space remaining between the core 80 and the hinged platen 86. The hinged platen 86 comprises three sections 86A, 86B, and 86C. Movable sections 86A and 86B can move on about hinges 88A and 88B respectively, toward intermediate section 86C, to change a U shaped cavity having a size that is complementary to the size of the core 80. In other words, the two outside platen sections (86A, 86B) can be rotated (e.g., 90 degrees) from a flat to a forming orientation (e.g., vertical orientation) adjacent the core 80, to form a U shaped cavity for forming the shell. The movable sections 86A and 86B can be moved from the rest position to the forming position using various methods such as manually, using hydraulic, using cylinders 90 (e.g., two gas (e.g., air) operated cylinders) to form the U shaped shell.

The process can comprise UD layers laid up in a desired layer orientation and consolidated to form a laminate. The consolidated laminate 92 can be located on the hinged platen 86 such that the area of the laminate intended to be the sides will be located over the hinged section 86A or 86B. The consolidated laminate 92 is heated to the glass transition temperature of the resin matrix. The shell 6 is then formed by lowering the core 80 into the forming position and rotating the movable sections 86A and 86B, e.g., actuating the hinged platen sections by the air cylinders 90, to rotate (e.g., 90 degrees) to a forming position, thereby bending the heated, consolidated laminate into a U shape. The degree of rotation of the movable sections 86A and 86B is dependent on the desired angles of the sides of the shell 6 (e.g., parallel sides, or sides oriented at a different angle). Once the core 80 and movable sections 86A and 86B are in the forming position, the heated consolidated laminate is cooled to solidify the laminate and form the shell 6.

For example, the layers used in the laminate can be formed by forming a film of the resin matrix (e.g., having a thickness or less than or equal to 300 micrometers (μm)). The pre-consolidated laminate can be heated above the Tg (glass transition temperature) of the resin matrix, allowing the resin to flow between the fibers in their bundle to form a resin-fiber structure. For example, Noryl™ GTX resin film (e.g., having a thickness of 76.2 micrometers (0.003 inch) and 127 micrometers (0.005 inch)) is heated into a fiber or fabric to form the layer. The film thickness is dictated by the desired laminate ratio by volume. A 60/40 ratio by volume, for example, will usually yield a 50/50 ratio by weight with a 3K toe weave or 3K twill weave. This is also dependent on the volume density of the fabric. The use of the GTX resin in the consolidated laminate will help promote better adhesion between the formed laminate shell and the plastic overmolded structure. Optionally, the layers for the laminate can be formed using a powder method. In this method, a powder (e.g., ground powder) is applied to the fiber structure, to form a powdered fiber. The powdered fabric is heated to semimelt the powder into the fabric, thereby impregnating (e.g., semi-impregnating) the powder into the fiber tape or fabric to form the layer. For example, the powder is distributed (e.g., evenly distributed) across the fabric and then by means of ultrasonics, air impingement is forced between the fiber bundles then heated above the Tg so the resin can coat the fiber bundles after which the fiber structure is rolled and the fibers are pre-coated or semi impregnated to form the resin-fiber structure. Possible powders can be formed from any of the above mention thermoplastic materials, such as Noryl™ GTX resin, LEXAN™ resin, ULTEM™ resin, VALOX™ resin, CYCOLAC™ resin, STAMAX™ resin, and combinations comprising at least one of the foregoing, such as an alloy some of these resins.

Figure 14:
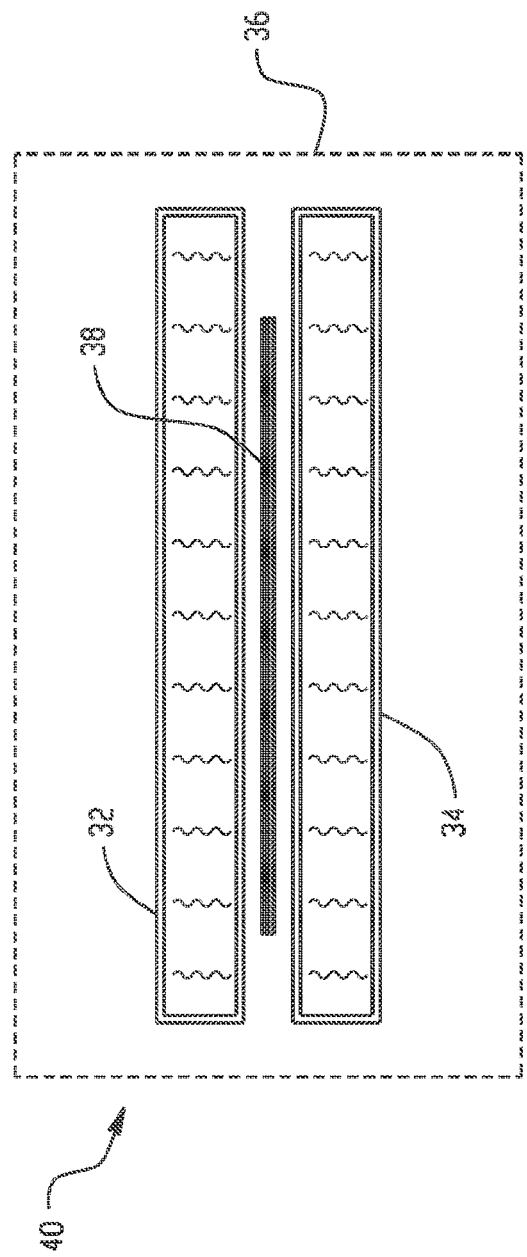
FIG. 14 is a schematic drawing of an embodiment of a laminator.

Once the layers (i.e., the resin-fiber structure) are prepared, the laminate can be formed. The layers (i.e., resin-fiber structure) can be laid-up and the lay-up can then be placed in a laminator. The layup is then dried, e.g., allowing residual moisture to surface and be removed. After drying, the layup is heated (e.g., to a resin melt temperature) under vacuum to enable the fiber to wet out. Pressure is then applied to the layup. The temperature is then reduced (e.g., rapidly to room temperature), the pressure is thereafter released and the laminate is then removed. For example, referring to FIG. 14, a layup 38 is placed between a first platen 32 and a laminate platen 34. The temperature in the laminator 40 is increased to a temperature sufficient to remove residual moisture (e.g., depending upon the resin matrix, 100° C. to 200° C., specifically, 125° C. to 165° C., e.g., 150° C.). This temperature can be held for enough time for residual moisture to surface on the layup (e.g., a hold time of up to 30 minutes, specifically, 2 to 20 minute, more specifically, 5-10 minutes). The actual time will depend upon the moisture content of the resin and the thickness of the layup. After drying hold time is complete, a vacuum is pulled in the vacuum chamber 36. The vacuum can be pulled (e.g., to a pressure of less than 30 inches of mercury (Hg), specifically, less than 28.8 Hg, and more specifically 10 Hg, and the process temperature can be increased. The temperature can be increased to greater than or equal to a melt temperature of resin in the layup (e.g. to greater than or equal 205° C., specifically, 218° C., and more specifically, 232 to 400° C., wherein the specific temperature is dependent upon the particular resin). Once the process temperature is reached, pressure is applied to the layup 38 by creating relative motion between the first platen 32 and the laminate platen 34. The pressure can be greater than or equal to 1 megaPascal (MPa), specifically, greater than or equal to 1.5 MPa, and more specifically, 1.75 MPa to 2.5 MPa, e.g., 2 MPa (e.g., about 300 pounds per square inch (psi)).

It is noted that the pressure is adjusted based upon the layup, wherein too much pressure will inhibit resin wet out of fibers, e.g., due to pressing fiber bundles tightly together restricting resin flow into the bundle, while too little pressure will inhibits the laminates attaining a desired thickness.

After the pressure is applied the temperature is reduced so that the laminate solidifies and can be removed from the laminator. For example the temperature can be reduced to less than or equal to 38° C., specifically, less than or equal to 33° C., and more specifically, less than or equal to 27° C. The temperature reduction can be by rapid cooling (e.g., reducing the temperature by greater than or equal to 25° F. per minute). Once cooled, the vacuum and pressure can be released and the laminate can be removed.

Figure 15:
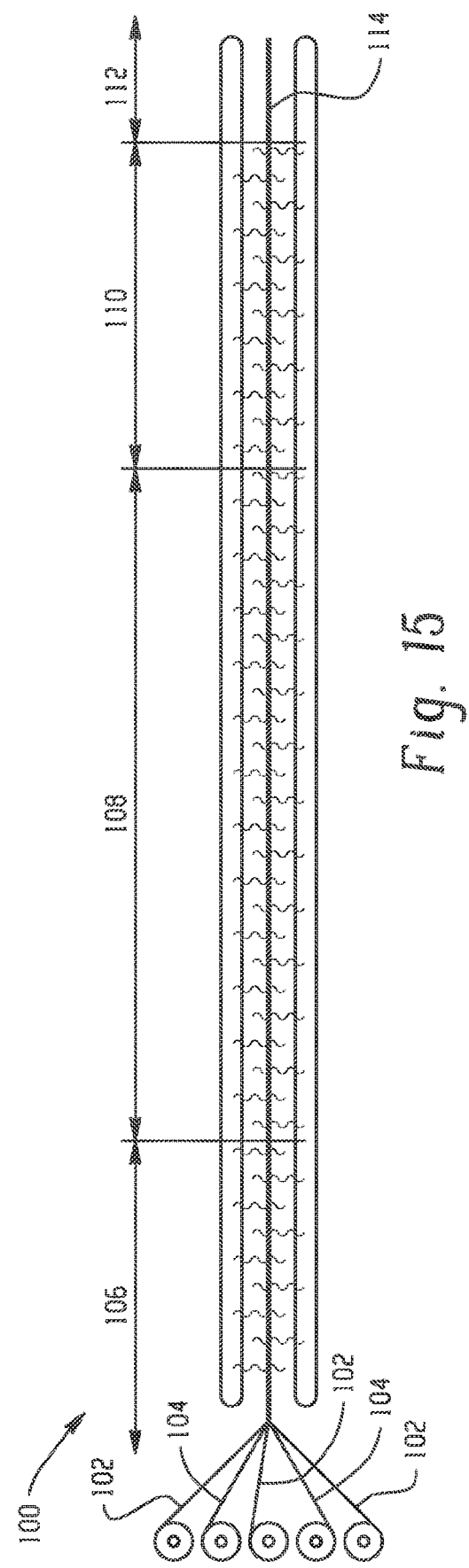
FIG. 15 is a schematic view of a dynamic lamination process with a twin belt laminator.

Alternatively, a laminate can be formed in a dynamic laminating process, e.g., using a heated twin belt laminator. In this process, alternating feeds of film and fabric (or tape) is fed into the laminator, with the number of films and fabrics dependent upon the desired thickness of the laminate. In the first stage, the drying stage, pressure is applied to allow moisture release. In the next stage, the melt zone, the temperature and pressure are increased to cause the resin to flow into the fabric. In the cooling zone, the layup is cooled under pressure to completely solidify the laminate. For example, referring to FIG. 15, films 102 and fabrics 104 are fed into the twin belt laminator 100. Pressure (e.g., a pressure of greater than or equal to 10 pounds per square inch (psi), for example 10 psi to 25 psi) is applied in the drying zone 106, e.g., during the first stage, allowing moisture to escape. In the next stage, the melt zone 108, the pressure and temperature are increased to allow the resin flow into the fabric. The temperature, which is dependent on the particular resin, can be within the melt process temperature of such resin. The pressure, which is also dependent upon the particular resin and particularly the melt viscosity thereof, can be greater than or equal to 50 psi, for example, the pressure can vary from 50 psi to 500 psi. From the melt zone 108, the layup enters the cooling zone 110 where it is solidified under pressure to form the laminate 114. The laminate 114 can then optionally be cut to the desired length. The continuous laminating process can yield sheet products four feet wide and cut to any length after which smaller pieces can be cut for a desired application.

Figure 10:
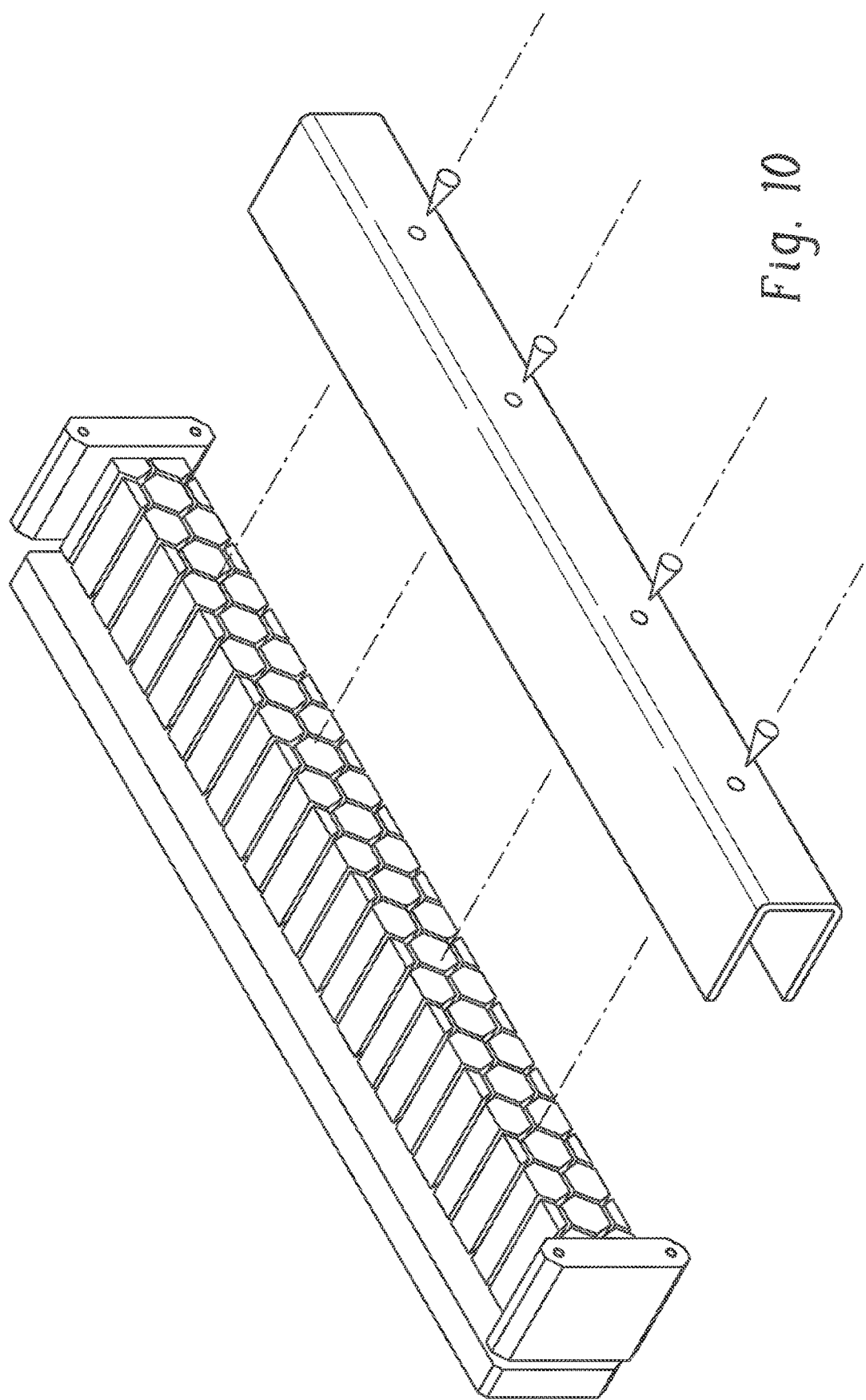
FIG. 10 is an illustration of an embodiment of an injection molding scheme showing the gate and hence reinforced polymer flow scheme.

As illustrated in FIG. 10, a sequential gate opening system in the injection molding tool can be incorporated to get favorable alignment of fibers (short and/or long fibers) and minimize weld lines in the polymer reinforcement structure 4 (e.g., honeycomb or ribbed geometry). As a result, the injection molding cavity can fill from one end to the other, enhancing the quality of the final product.

By uniting the structural component (e.g., any hollow, metal, load bearing component in the vehicle) and hybrid reinforcements as described herein, several advantages are realized: (i) the design is lighter compared to all metallic components, yet the same structural requirements are still met, (ii) the plastic reinforcements have a high stiffness by weight ratio compared to other reinforcements (e.g., compared to foam, expandable epoxy, and steel reinforcements), (iii) there is better thermal performance during paint cycle compared to foam or epoxy reinforcement solutions, and/or (iv) no changes are required in existing assembly line; e.g., the crush countermeasure can be manufactured and used in a motor vehicle without the use of additional processing steps. In addition, since the same structural integrity can be attained at a reduced weight, or better structural integrity can be attained at the same weight of standard, all steel structural components (e.g., BIW), this design is better suited to meet the carbon dioxide emission requirements due to be in effect by 2016, as well as meeting the safety requirements of the National Highway Traffic Safety Administration (NHTSA).

Set forth below are some embodiments of the tool, laminate, shell, energy absorbing device, vehicle, and structural components described herein.

Embodiment 1: An energy-absorbing device, comprising: a polymer reinforcement structure, wherein the polymer reinforcement structure comprises a polymer matrix and chopped fibers; and a shell comprising 2 walls extending from a back and forming a shell channel, wherein the shell comprises continuous fibers and a resin matrix; wherein the polymer reinforcement structure is located in the shell channel.

Embodiment 2: The device of Embodiment 1, wherein some of the polymer matrix is located in openings at edges of the shell, forming a mechanical bond between the shell and the polymer reinforcement structure.

Embodiment 3: The device of any of Embodiments 1-2, wherein the polymer reinforcement structure comprises honeycombs and/or ribs, e.g., cross-rib pattern or honeycomb.

Embodiment 4: The device of any of Embodiments 1-3, wherein the polymer reinforcement structure comprises honeycombs that extend in the same direction as the walls toward the back.

Embodiment 5: The device of any of Embodiments 1-4, wherein the shell channel has a major axis, and wherein the honeycomb structure comprises honeycomb channels, and wherein the honeycomb channels are oriented perpendicular to the major axis.

Embodiment 6: The device of any of Embodiments 1-5, wherein the polymer reinforcement structure is inseparably attached to the shell.

Embodiment 7: The device of any of Embodiments 1-6, wherein the plastic element has a hollow honeycomb structure with hexagonal comb geometry, and has a length of 150 mm to 350 mm.

Embodiment 8: The device of any of Embodiments 1-7, wherein the shell comprises a plurality of holes through the walls.

Embodiment 9: The device of any of Embodiments 1-8, wherein the device forms vehicle component comprising bumper beam, rail, pillar, chassis, floor rocker, cross-bar, an instrument panel, cross-car member, door support bar, seat structure, suspension controller, engine block, oil pump cover, and combinations comprising at least one of the foregoing.

Embodiment 10: The device of Embodiment 9, wherein, besides optional metal fibers, the device is metal free.

Embodiment 11: The device of Embodiment 9, wherein the device comprises no metal shell, coating, or housing.

Embodiment 12: The energy absorbing device of any of Embodiments 1-11, wherein energy-absorbing device is metal free.

Embodiment 13: The energy absorbing device of any of Embodiments 1-12, wherein the continuous fibers are unidirectional.

Embodiment 14: A structural body of a vehicle, comprising: a hollow structural vehicle component comprising walls that define a cavity, wherein the vehicle component has a component length; and the energy-absorbing device of any of Embodiments 1-13; wherein the energy-absorbing device is located in the cavity.

Embodiment 15: The structural body of Embodiment 14, wherein the structural vehicle component is selected from the group consisting of bumper beam, rail, pillar, chassis, floor rocker, cross-bar, an instrument panel, cross-car member, door support bar, seat structure, suspension controller, engine block, oil pump cover, as well as other components, as well as combinations comprising at least one of the foregoing.

Embodiment 16: The structural body of Embodiment 15, wherein the structural vehicle component is a floor rocker.

Embodiment 17: A vehicle, comprising: the structural vehicle component; and the energy-absorbing device of any of Embodiments 1-13, optionally located in the structural vehicle component; an engine; and a drive mechanism.

Embodiment 18: A vehicle, comprising: the structural vehicle component, wherein the structural vehicle component is the energy-absorbing device of any of Embodiments 1-13; an engine; and a drive mechanism.

Embodiment 19: A forming tool for forming a laminate shell, comprising: a first platen comprises a core; a hinged platen, comprising first movable section, second movable section, and intermediate section located between first movable section and second movable section; a first hinge connecting the first movable section and the intermediate section, such that the first movable section can move from a flat position to a forming position adjacent the core; and a second hinge connecting the second movable section and the intermediate section, such that the second movable section can move from a flat position to a forming position adjacent the core; wherein the core extends from the first platen, between the first platen and the hinged platen; and wherein the first platen and the hinged platen are configured to create relative motion therebetween to decrease a distance between the core and the intermediate section.

Embodiment 20: The forming tool of Embodiment 19, further comprising cylinders oriented to move the first movable section, or the second movable section, or the first movable section and the second movable section.

Embodiment 21: A method of forming a laminate, comprising: feeding fiber structure and resin film to a heated belt to form layup; optionally applying a drying pressure to allow moisture release to form a dried layup; increasing a temperature and the pressure to flow the resin into the fiber structure to form the laminate; and cooling the laminate to solidify the laminate.

Embodiment 22: The method of Embodiment 21, wherein the laminate is cooled under pressure.

Embodiment 23: The method of Embodiment 22, wherein the laminate is cooled under the pressure of greater than or equal to 30 psi, or a pressure of greater than or equal to 50 psi, or a pressure of 50 psi to 500 psi.

Embodiment 24: The method of any of Embodiments 21-23, wherein the drying pressure is greater than or equal to 10 psi.

Embodiment 25: The method of any of Embodiments 21-24, wherein increasing the temperature and the pressure to flow the resin comprises increasing the temperature to greater than or equal to a melt temperature of the resin, and the pressure to greater than or equal to 50 psi.

Embodiment 26: The method of any of Embodiments 21-25, wherein the layup comprises alternating layers of fiber structure and resin.

Embodiment 27: The method of any of Embodiments 21-26, wherein the layup comprises greater than or equal to 4 fiber structures.

Embodiment 28: The method of any of Embodiments 21-27, wherein the layup comprises greater than or equal to 6 fiber structures.

Embodiment 29: A method of forming a laminate, comprising: laying up resin-fiber structures in a laminator to form a layup; optionally drying the layup; pulling a vacuum in the laminator; increasing a temperature to a process temperature; creating relative motion between platens of the laminator to apply pressure to the layup at the process temperature to form the laminate; cooling the laminate.

Embodiment 30: The method of Embodiment 29, wherein the resin-fiber structure is formed by: applying powder to a fiber structure; forcing the powder into the fabric structure; heating to above a Tg of the resin to form a heated fiber structure; and rolling the heated fiber structure to form the resin fiber structure.

Embodiment 31: The method of Embodiment 30, wherein the powder is forced into the fiber structure with ultrasonic air impingement.

Embodiment 32: The method of any of Embodiments 21-31, further comprising laying up the fiber structures such that the layup has a fiber orientation of alternating 0 degrees and 90 degrees, (0/45/−45), (0/60/−60), (0/45/90/0), (0/90/0/90/90/0/90/0), (0/90/0/0/90/0), (0/90/45/0/0/45/90/0), or (0/60/90/90/90/60/0).

Embodiment 33: The method of an of Embodiments 21-32, further comprising laying up the fiber structures such that the layup has a fiber orientation forming a balanced layup.

Embodiment 34: A method of forming a laminate shell, comprising: placing the laminate of any of Embodiments 21-33 onto a hinged platen in a forming tool; heating the laminate; moving a first movable section and second movable section toward a core, and decreasing a distance between the core and an intermediate section, such that the laminate bends to form the shell; cooling the shell; and removing the shell from the forming tool.

Embodiment 35: The method of Embodiment 34, wherein the shell has a total thickness of 0.2 to 10 mm, or 0.3 to 3 mm, or 0.5 mm to 2 mm, or 0.5 mm to 1.5 mm.

Embodiment 36: A method of forming an energy-absorbing device, comprising: overmolding the shell of any of Embodiments 34-35 with a polymer reinforcement structure to form the energy absorbing device.

Embodiment 37: The method of Embodiment 36, wherein the polymer reinforcement structure comprises honeycombs and/or ribs.

Embodiment 38: The method of any of Embodiments 36-37, wherein the polymer reinforcement structure has channels that extend parallel to the sides of the shell and perpendicular to an intermediate section of the shell.

Embodiment 39: An energy-absorbing device, comprising: a polymer reinforcement structure, wherein the polymer reinforcement structure comprises a polymer matrix and chopped fibers; and a shell comprising 2 walls extending from a back and forming a shell channel, wherein the shell comprises continuous fibers and a resin matrix, and wherein the resin matrix is a polymeric resin matrix; wherein the polymer reinforcement structure is located in the shell channel; wherein the shell comprises a laminate formed from a layup of fiber structures such that the layup has a fiber orientation of angles comprising at least two different angles.

Embodiment 40: The device of Embodiment 39, wherein the angles are selected from 0 degrees and 90 degrees, (0/45/−45), (0/60/−60), (0/45/90/0), (0/90/0/90/90/0/90/0), (0/90/0/0/90/0), (0/90/45/0/0/45/90/0), or (0/60/90/90/90/60/0).

Embodiment 41: The device of any of Embodiments 39-40, wherein the angle comprises a fiber orientation forming a balanced layup.

Embodiment 42: The device of any of Embodiments 39-41, wherein the polymer reinforcement structure comprises honeycombs and/or ribs.

Embodiment 43: The device of any of Embodiments 39-42, wherein the polymer reinforcement structure comprises honeycombs that extend in the same direction as the walls toward the back.

Embodiment 44: The device of any of Embodiments 39-43, wherein the shell channel has a major axis, and wherein the honeycomb structure comprises honeycomb channels, and wherein the honeycomb channels are oriented perpendicular to the major axis.

Embodiment 45: The device of any of Embodiments 39-44, wherein the polymer reinforcement structure is inseparably attached to the shell.

Embodiment 46: The device of any of Embodiments 39-45, wherein the plastic element has a hollow honeycomb structure with a hexagonal comb geometry.

Embodiment 47: The device of any of Embodiments 39-46, wherein the shell comprises a plurality of holes through the walls.

Embodiment 48: The device of any of Embodiments 39-47, wherein, besides optional metal fibers, the device is metal free.

Embodiment 49: The device of any of Embodiments 39-48, wherein the device comprises no metal shell, coating, or housing.

Embodiment 50: The device of any of Embodiments 39-49, wherein the polymeric resin matrix and the polymer matrix are independently selected from polycarbonate; polybutylene terephthalate; acrylonitrile-butadiene-styrene;

polycarbonate; acrylic-styrene-acrylonitrile; acrylonitrile-(ethylene-polypropylene diamine modified)-styrene; phenylene ether resins; polyamides; phenylene sulfide resins; polyvinyl chloride; polystyrene; polyethylene; polypropylene; polyetherimide; and combinations comprising at least one of the foregoing.

Embodiment 51: The device of any of Embodiments 39-50, wherein the polymeric resin matrix and the polymer matrix are independently selected from polycarbonate blends; polycarbonate/PBT blends; polycarbonate/ABS blends; copolycarbonate-polyesters; blends of polyphenylene ether/polyamide; polyamides; and comprising at least one of the foregoing.

Embodiment 52: The device of any of Embodiments 39-51, wherein the polymeric resin matrix and the polymer matrix are independently selected from Noryl™ GTX resin, LEXAN™ resin, ULTEM™ resin, VALOX™ resin, CYCOLAC™ resin, and/or STAMAX™ resin.

Embodiment 53: The device of any of Embodiments 39-52, wherein the continuous fibers are selected from glass fibers, carbon fibers, bamboo fibers, aramid fibers, kevlar fibers, and combinations comprising at least one of the foregoing.

Embodiment 54: The device of any of Embodiments 39-53, wherein the chopped fibers are selected from glass fibers, carbon fibers, bamboo fibers, aramid fibers, kevlar fibers, and combinations comprising at least one of the foregoing.

Embodiment 55: The device of any of Embodiments 39-54, wherein the continuous fibers and the chopped fibers are independently selected from glass fibers, carbon fibers, and combinations comprising at least one of the foregoing.

Embodiment 56: The device of any of Embodiments 39-55, wherein device is metal free.

Embodiment 57: The device of any of Embodiments 39-56, wherein the continuous fibers are unidirectional.

Embodiment 58: A structural body of a vehicle, comprising: a hollow structural vehicle component comprising walls that define a cavity, wherein the structural vehicle component has a component length; and the energy-absorbing device of any of Embodiments 39-57; wherein the energy-absorbing device is optionally located in the cavity.

Embodiment 59: The structural body of Embodiment 58, wherein the structural vehicle component is selected from the group consisting of bumper beam, rail, pillar, chassis, floor rocker, cross-bar, an instrument panel, cross-car member, door support bar, seat structure, suspension controller, engine block, oil pump cover, as well as other components, as well as combinations comprising at least one of the foregoing.

Embodiment 60: The structural body of Embodiment 59, wherein the structural vehicle component is a floor rocker.

Embodiment 61: A vehicle, comprising: the structural vehicle component; and the energy-absorbing device of any of Embodiments 39-57, located in the structural vehicle component; an engine; and a drive mechanism.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to identify one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. As used herein, "free" is intended to only include impurities and not intentionally added elements.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of forming a shell of a crush countermeasure for a body-in-white (BIW) structural vehicle component, comprising:
    forming a laminate by:
        feeding a fiber structure and a resin to a heated belt laminator to form a layup, wherein the layup comprises alternating layers of the fiber structure and the resin, wherein fiber structure, for each one of the layers, is a unidirectional fibrous tape;
        laying up the fiber structure such that, within the layup, fibers of the fiber structure within each one of the layers are oriented at a different angle than the fibers within at least an adjacent one of the layers; increasing a temperature and a pressure to flow the resin into the fiber structure to form the laminate; and
        cooling the laminate to solidify the laminate; and
    forming the laminate into a U-shape of the shell of the crush countermeasure such that the shell comprises two walls extending parallel to each other from a back and forming a shell channel, having a major axis extending between open ends of the shell channel, wherein the two walls extend continuously along the major axis, between the open ends of the shell channel; and
    forming a ribbed or honeycomb shaped reinforcement along the shell channel with a chopped fiber reinforced polymer.

2. The method of claim 1, wherein the laminate is cooled under the pressure of greater than or equal to 206.8 KiloPascals (30 psi).

3. The method of claim 1, wherein the laminate is cooled under the pressure of greater than or equal to 344.7 KiloPascals (50 psi).

4. The method of claim 1, wherein the laminate is cooled under the pressure of 344.7 KiloPascals (50 psi) to 3,447 KiloPascals (500 psi).

5. The method of claim 1, wherein increasing the temperature and the pressure to flow the resin comprises increasing the temperature to greater than or equal to a melt temperature of the resin, and the pressure to greater than or equal to 344.7 KiloPascals (50 psi).

6. The method of claim 5, wherein the layup comprises greater than or equal to 4 fiber structures.

7. The method of claim 5, wherein the layup comprises greater than or equal to 6 fiber structures.

8. The method of claim 1, wherein the laminate is metal free.

9. The method of claim 1, wherein when laying up the fiber structure, within the layup, the fibers of the fiber structure, in adjacent ones of the layers, are oriented according to a layup pattern selected from:
- 0 degrees and 90 degrees;
- 0 degrees, 45 degrees, and −45 degrees;
- 0 degrees, 60 degrees, and −60 degrees;
- 0 degrees, 45, degrees 90 degrees, and 0 degrees;
- 0 degrees, 90 degrees, 0 degrees, 90 degrees, 90 degrees, 0 degrees, 90 degrees, and 0 degrees;
- 0 degrees, 90 degrees, 0 degrees, 0 degrees, 90 degrees, and 0 degrees; or
- 0 degrees, 90 degrees, 45 degrees, 0 degrees, 0 degrees, 45 degrees, 90 degrees, and 0 degrees.

10. The method of claim 1, wherein when laying up the fiber structure, within the layup, the fibers of the fiber structure, in adjacent ones of the layers, are oriented according to a balanced layup pattern selected from:
- 0 degrees, 90 degrees, 0 degrees, 90 degrees, 90 degrees, 0 degrees, 90 degrees, and 0 degrees;
- 0 degrees, 90 degrees, 0 degrees, 0 degrees, 90 degrees, and 0 degrees; or
- 0 degrees, 90 degrees, 45 degrees, 0 degrees, 0 degrees, 45 degrees, 90 degrees, and 0 degrees.

11. The method of claim 1, wherein when forming the laminate into the U-shape of the shell, the laminate is placed into a tool cavity of a forming tool, and the forming tool is heated to make the laminate formable, and the laminate is thereafter compressed in the tool cavity to form the U-shape of the shell.

12. A method of configuring a crush countermeasure in a body-in-white (BIW) structural vehicle component, comprising:
- obtaining the BIW structural vehicle component defining a first hollow metal structural section;
- forming a shell of the crush countermeasure by:
  - forming a laminate by:
    - feeding a fiber structure and a resin to a heated belt laminator to form a layup, wherein the layup comprises alternating layers of the fiber structure and the resin, wherein fiber structure, for each one of the layers, is a unidirectional fibrous tape;
    - laying up the fiber structure such that, within the layup, fibers of the fiber structure within h one of the layers are oriented a La different angle than the fibers within at least an adjacent one of the lavers;
    - increasing a temperature and a pressure to flow the resin into the fiber structure to form the laminate; and
    - cooling the laminate to solidify the laminate; and
  - forming the laminate into a U-shape of the shell of the crash countermeasure such the shell comprises two walls extending parallel to each other from a back and forming a shell channel, having a major axis extending between open ends of the shell channel, wherein the two walls extend continuously along the major axis, between the open ends of the shell channel; and
- installing the shell at the hollow metal structural section of the BIW structural vehicle component.

13. The method of claim 12, wherein the laminate is cooled under the pressure of greater than or equal to 206.8 KiloPascals (30 psi).

14. The method of claim 12, wherein the laminate is cooled under the pressure of greater than or equal to 344.7 KiloPascals (50 psi).

15. The method of claim 12, wherein the laminate is cooled under the pressure of 344.7 KiloPascals (50 psi) to 3,447 KiloPascals (500 psi).

16. The method of claim 12, wherein increasing the temperature and the pressure to flow the resin comprises increasing the temperature to greater than or equal to a melt temperature of the resin, and the pressure to greater than or equal to 344.7 KiloPascals (50 psi).

17. The method of claim 16, wherein the layup comprises greater than or equal to 4 fiber structures.

18. The method of claim 16, wherein the layup comprises greater than or equal to 6 fiber structures.

19. The method of claim 12, wherein the laminate is metal free.

20. The method of claim 12, wherein when laying up the fiber structure, within the layup, the fibers of the fiber structure, in adjacent ones of the layers, are oriented according to a layup pattern selected from:
- 0 degrees and 90 degrees;
- 0 degrees, 45 degrees, and −45 degrees;
- 0 degrees, 60 degrees, and −60 degrees;
- 0 degrees, 45, degrees 90 degrees, and 0 degrees;
- 0 degrees, 90 degrees, 0 degrees, 90 degrees, 90 degrees, 0 degrees, 90 degrees, and 0 degrees;
- 0 degrees, 90 degrees, 0 degrees, 0 degrees, 90 degrees, and 0 degrees; or
- 0 degrees, 90 degrees, 45 degrees, 0 degrees, 0 degrees, 45 degrees, 90 degrees, and 0 degrees.

21. The method of claim 12, wherein when laying up the fiber structure, within the layup, the fibers of the fiber structure, in adjacent ones of the layers, are oriented according to a balanced layup pattern selected from:
- 0 degrees, 90 degrees, 0 degrees, 90 degrees, 90 degrees, 0 degrees, 90 degrees, and 0 degrees;
- 0 degrees, 90 degrees, 0 degrees, 0 degrees, 90 degrees, and 0 degrees; or
- 0 degrees, 90 degrees, 45 degrees, 0 degrees, 0 degrees, 45 degrees, 90 degrees, and 0 degrees.

22. The method of claim 12, including forming a ribbed or honeycomb shaped reinforcement along the shell channel with a chopped fiber reinforced polymer.

23. The method of claim 12, wherein when forming the laminate into the U-shape of the shell, the laminate is placed into a tool cavity of a forming tool, and the forming tool is heated to make the laminate formable, and the laminate is thereafter compressed in the tool cavity to form the U-shape of the shell.

* * * * *